United States Patent
Sujan et al.

(10) Patent No.: US 10,197,156 B2
(45) Date of Patent: Feb. 5, 2019

(54) SYSTEMS AND METHODS FOR DYNAMIC GEAR STATE AND VEHICLE SPEED MANAGEMENT

(71) Applicant: Cummins Inc., Columbus, IN (US)

(72) Inventors: Vivek Anand Sujan, Columbus, IN (US); Kenneth Follen, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/801,938

(22) Filed: Nov. 2, 2017

(65) Prior Publication Data

US 2018/0135745 A1  May 17, 2018

Related U.S. Application Data

(63) Continuation of application No. 14/719,917, filed on May 22, 2015, now Pat. No. 9,835,248.

(60) Provisional application No. 62/003,795, filed on May 28, 2014.

(51) Int. Cl.
| | |
|---|---|
| *F16H 59/52* | (2006.01) |
| *F16H 59/66* | (2006.01) |
| *F16H 59/74* | (2006.01) |
| *F16H 61/00* | (2006.01) |
| *F16H 61/02* | (2006.01) |

(52) U.S. Cl.
CPC ......... *F16H 61/0213* (2013.01); *F16H 59/74* (2013.01); *F16H 59/52* (2013.01); *F16H 2059/663* (2013.01); *F16H 2059/666* (2013.01); *F16H 2059/743* (2013.01); *F16H 2061/0012* (2013.01); *F16H 2061/0015* (2013.01); *F16H 2061/0234* (2013.01)

(58) Field of Classification Search
None
See application file for complete search history.

(56) References Cited

U.S. PATENT DOCUMENTS

| | | | |
|---|---|---|---|
| 5,832,400 | A | 11/1998 | Takahashi et al. |
| 5,839,534 | A | 11/1998 | Chakraborty et al. |
| 5,995,895 | A | 11/1999 | Watt et al. |
| 6,128,570 | A | 10/2000 | Akhteruzzaman |
| 6,169,949 | B1 | 1/2001 | Sato |
| 6,278,928 | B1 | 8/2001 | Aruga et al. |
| 6,363,310 | B1 | 3/2002 | Schuplin et al. |

(Continued)

FOREIGN PATENT DOCUMENTS

WO    2008094114 A1    8/2008

*Primary Examiner* — Jacob S. Scott
(74) *Attorney, Agent, or Firm* — Taft Stettinius & Hollister LLP

(57) ABSTRACT

According to one aspect of the present disclosure, a control system, apparatus, and method includes dynamic optimization of at least one of a vehicle reference speed and/or transmission gear state of a vehicle by determining current and future engine power requirements from the current and forward-looking route conditions to improve performance, drivability, and/or fuel economy of the vehicle over what is achievable through conventional gear state selection via static calibration tables and conventional shifting strategies. The selection of the vehicle reference speed and gear state can be performed independently of one another in one embodiment, and complementary of one another in another embodiment.

22 Claims, 13 Drawing Sheets

(56) References Cited

U.S. PATENT DOCUMENTS

| | | |
|---|---|---|
| 6,374,173 B1 | 4/2002 | Ehlbeck |
| 6,847,887 B1 | 1/2005 | Casino |
| 6,856,897 B1 | 2/2005 | Phuyal et al. |
| 7,072,762 B2 | 7/2006 | Minami et al. |
| 7,426,432 B2 | 9/2008 | Kawazoe et al. |
| 7,440,835 B2 | 10/2008 | Shima |
| 8,498,795 B2 | 7/2013 | Eriksson et al. |
| 8,498,809 B2 | 7/2013 | Bill |
| 8,744,718 B2 * | 6/2014 | Johansson ............. B60K 31/00 340/988 |
| 8,849,539 B2 * | 9/2014 | Johansson ............. B60W 10/06 701/1 |
| 2002/0138190 A1 | 9/2002 | Hellman et al. |
| 2003/0109980 A1 | 6/2003 | Kojima et al. |
| 2004/0084237 A1 | 5/2004 | Petrie, Jr. |
| 2005/0027423 A1 | 2/2005 | Minami et al. |
| 2007/0192013 A1 | 8/2007 | Bando et al. |
| 2008/0091327 A1 | 4/2008 | Tsuchiya et al. |
| 2008/0319618 A1 | 12/2008 | Sjogren et al. |
| 2009/0018738 A1 | 1/2009 | Kuwahara et al. |
| 2009/0164081 A1 | 6/2009 | Meloche et al. |
| 2009/0259354 A1 | 10/2009 | Krupadanam et al. |
| 2010/0030458 A1 | 2/2010 | Coughlin |
| 2010/0049400 A1 | 2/2010 | Duraiswamy et al. |
| 2011/0106388 A1 | 5/2011 | Boeckenhoff et al. |
| 2011/0160990 A1 | 6/2011 | Mineta |
| 2011/0166754 A1 | 7/2011 | Kolk et al. |
| 2011/0276216 A1 | 11/2011 | Vaughan |
| 2012/0022764 A1 | 1/2012 | Tang et al. |
| 2012/0197504 A1 | 8/2012 | Sujan et al. |
| 2012/0209505 A1 | 8/2012 | Breed et al. |
| 2013/0030668 A1 | 1/2013 | Eriksson et al. |
| 2013/0085651 A1 | 4/2013 | Johannsson et al. |
| 2014/0244129 A1 | 8/2014 | Filev et al. |
| 2014/0277835 A1 | 9/2014 | Filev et al. |
| 2015/0049913 A1 | 2/2015 | Zhong |

\* cited by examiner

SYSTEMS AND METHODS FOR DYNAMIC GEAR STATE AND VEHICLE SPEED MANAGEMENT

CROSS-REFERENCE TO RELATED APPLICATIONS

The present application is a continuation of U.S. patent application Ser. No. 14/719,917 filed May 22, 2015, which claims the benefit of U.S. Provisional Patent Application Ser. No. 62/003,795 filed May 28, 2014, the contents of each application is hereby incorporated by reference in their entirety.

TECHNICAL FIELD

The technical field generally relates to control of an engine and transmission for a vehicle, and more particularly to dynamic optimization of transmission gear state and vehicle speed for various operating conditions.

BACKGROUND

Traditionally, vehicles equipped with conventional automatic transmissions perform gear selection through static calibration (i.e., look-up) tables pre-programmed into a transmission control unit. As a result, during certain conditions, drivability, performance, trip time, and fuel economy of the vehicle are negatively impacted. For example, under conventional transmission control, as the vehicle begins to climb or descend a hill, the transmission is generally not in the correct gear for the current power requirement. In the instance where the vehicle has begun to climb the hill, the gearing is generally too high and, as a result, the vehicle loses speed because the vehicle is under powered. In response, a conventional transmission control unit will downshift the transmission to gain access to greater power and recover to a desired or set cruising speed. Through such a transition, the vehicle loses additional speed due to the gear shift under load, further affecting drivability and fuel economy as the vehicle powers up to regain the desired speed. Moreover, under conventional vehicle speed control, the controller generally attempts to maintain a vehicle set speed regardless of whether the engine is or will be operating in an efficient region under the current engine power and speed requirements. Therefore, there remains a significant need for the apparatuses, methods, and systems disclosed herein.

SUMMARY

According to one aspect of the present disclosure, a control system, apparatus, and method includes dynamic optimization of at least one of a vehicle reference speed and/or transmission gear state of a vehicle by determining current and future engine power requirements from the current and forward-looking route conditions to improve performance, drivability, and/or fuel economy of the vehicle over what is achievable through conventional gear state selection via static calibration tables and conventional shifting strategies. Current and forward-looking route conditions may include terrain, weather conditions, traffic conditions, traffic control signs and signals, and posted speed limits. The selection of vehicle reference speed and gear state can be performed independently of one another in one embodiment, and complementary of one another in another embodiment.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
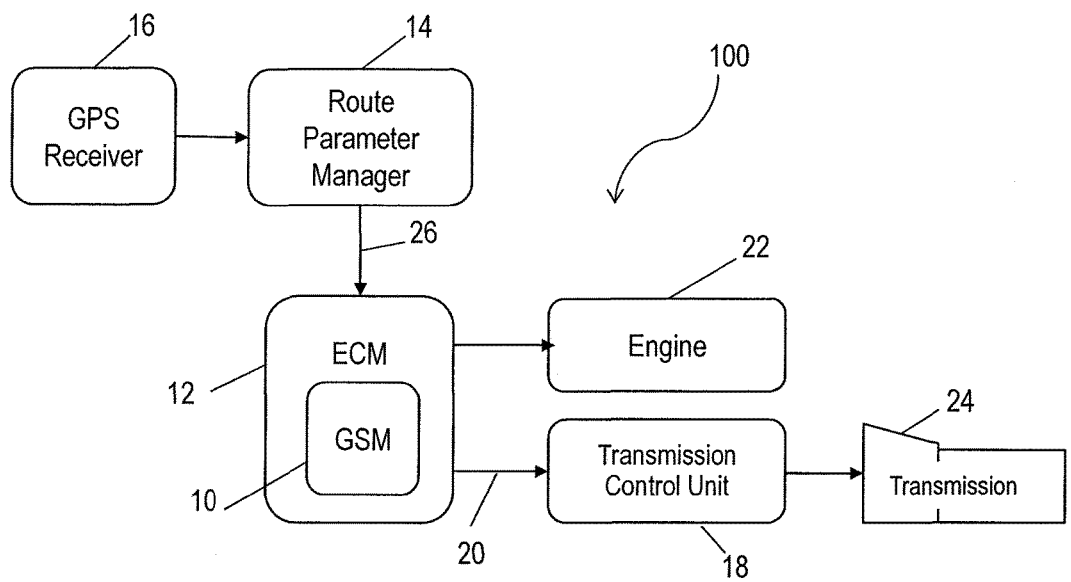
FIG. 1 shows a block diagram of a gear state management system according to an embodiment of the present disclosure.

For the purposes of promoting an understanding of the principles of the invention disclosed, reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated therein as would normally occur to one skilled in the art to which the invention relates, having the benefit of the present disclosure, are contemplated herein.

According to one aspect of the present disclosure, a control system, apparatus, and method includes dynamic optimization of at least one of a vehicle reference speed and transmission gear state of a vehicle by determining current and future engine power requirements for the current and forward-looking route conditions to improve performance, drivability, and/or fuel economy of the vehicle over what is achievable through conventional gear state selection via static calibration tables and conventional shifting strategies. The route conditions may include, but not be limited to, grade of the terrain, weather conditions, traffic conditions, traffic control signs and signals, and posted and effective speed limits. In at least one embodiment, a gear state selection for a transmission is a function of the current and future grade of the terrain travelled by the vehicle and of the engine power and speed requirements under the current and future grade conditions. In another embodiment, a vehicle reference speed may be modulated about a target reference set point to improve fuel economy over the course of the route travelled. In a further aspect of the present disclosure, the vehicle reference speed and transmission gear state selection may be determined in a cooperative manner to provide a solution that improves overall performance, drivability, and/or fuel economy of the vehicle. Accordingly, the selection of vehicle reference speed and gear state can be performed independently of one another in one embodiment, and complementary of one another in another embodiment.

With reference to FIG. 1, there is illustrated an exemplary hardware architecture for a dynamic gear state management (GSM) system 100 for a vehicle. The hardware architecture shown in FIG. 1 is but one example, and the GSM system 100 is not specific to this particular architecture. The GSM system 100 includes a GSM algorithm. The GSM system 100 may be included in a gear state management (GSM) module 10 configured to perform the GSM algorithm. The gear state management (GSM) module 10 may be incorporated into an engine control unit (ECU) 12 configured to control a powertrain of the vehicle, including an engine 22 and/or a transmission 24, as shown in FIG. 1. Alternatively, the GSM module 10 may be a separate control unit configured to interface with the ECM 12. The GSM algorithm, as implemented in the GSM module 10 in certain embodiments, generates a transmission gear state request, hereinafter a gear request 20, which may be communicated to a transmission control unit (TCU) 18. The gear request 20 from the GSM module 10 is interrogated by the TCU 18, which generates a gear command sent to the transmission 24 to shift the transmission 24 into the gearing prescribed by the gear command. Thus, the GSM module 10 controls the gear state of the transmission 24, which may be any suitable type of transmission, including but not limited to an automatic, semi-automatic, manumatic, continuously variable, electric variable, planetary gear set, and dual-clutch transmission.

The GSM module 10 may accept input from a route parameter manager 14, which can provide the GSM module 10 with information concerning the conditions of the route taken by the vehicle, referred to herein and shown in FIG. 1 as route condition information 26. The route condition information 26 may include a current route condition and a forward route condition. The current route condition may include the conditions of the route at the current location of the vehicle along the route. The forward route condition may include the conditions of the route for a certain distance or period in front of the vehicle along the route. The route associated with the forward route condition may be a projected route. The projected route may be a route programmed into a navigation system of the vehicle, which may communicate with the route parameter manager 14. Alternatively, the projected route may be the route for a certain distance or period in front of the vehicle along its current trajectory. The distance or period in front of the vehicle along its current and projected route for which forward route condition information data is available to the GSM module 10 may be referred to as a "look-ahead window." The range or size of the look-ahead window may be determined by such factors as the speed of the vehicle, the availability of route condition information, and the resolution of the route condition information. Under certain operating conditions, only the current route condition may be available.

For example, the route condition information 26 may include the current grade (i.e., change of elevation or pitch) of the road where the vehicle is along its current course (i.e., the current route condition). Moreover, the route condition information 26 may include the grade of the road for a certain distance along the projected route through the look-ahead window (i.e., the forward route condition). In such an embodiment, the route parameter manager 14 may provide the GSM module 10 with look-ahead or forward grade information, which the GSM module 10 may use to determine the gear request 20. The route condition information 26 may further include such information as traffic conditions, traffic control signs and signals, their type and location, posted and effective (i.e., actual travel rates) speed limits and, in certain embodiments, environmental conditions, such as precipitation and wind conditions.

The GSM algorithm may use the route condition information 26 to determine the projected engine power and speed requirements for the look-ahead window. The projected engine power and speed requirements may then be used to predict vehicle speed deviations. Such vehicle speed deviations may be due to changes in the terrain grade, traffic conditions, traffic control signs and signals and their location, speed limits or, in certain embodiments, environmental conditions, such as wind and precipitation conditions. The vehicle speed deviations may be, for example, from the vehicle set speed or the current vehicle speed. Based upon the determined engine power and speed requirements using the route condition information 26, the GSM algorithm communicates the prescribed gear request 20 to the TCU 18. The TCU 18 may act upon the gear request 20 if the TCU 18 determines it is safe or efficient to do so under the current engine speed and torque conditions, the vehicle speed, and/or other limiting operating conditions. For example, before acting upon the gear request 20, the TCU 18 may perform calculations to ensure the requested gear results in an engine and/or transmission speed that are within acceptable limits. Further, the specific timing of the gear state change may be affected by the vehicle speed, among other factors.

The gear states potentially available in a given engine and transmission combination may include neutral. Under certain operating conditions, the GSM algorithm may determine that operating in neutral is advantageous and desirable and may communicate the corresponding gear request 20 to the TCU 18. For example, the GSM algorithm may generate the gear request 20 to operate in neutral when the vehicle is approaching and/or is in a steep downhill event or a traffic control signal indicating a need to slow and potentially stop the vehicle.

Examples of operating conditions under which the GSM algorithm may communicate the gear request 20 to the TCU 18 include, but are not limited to: gear downshift prior to a steep uphill event; gear upshift prior to a steep downhill event; gear downshift approaching a traffic signal; gear downshift or upshift in inclement weather; selection of a desired gear state during a steep uphill or downhill event such that sufficient engine power is available and/or such that the engine 22 operates in the best region of operating efficiency; and selection of a desired gear state such that the cumulative or overall drivability over at least a portion of the route is increased. Under certain instantaneous operating conditions, the selection and communication of a particular gear state may be sub-optimal under the present conditions. Nonetheless, the particular gear state may provide the optimal trade-off of performance and efficiency over the course of the cumulative route, or at least a portion thereof. For example, a particular gear state may temporarily lower the operating efficiency of the engine but improve the drivability of the vehicle through the look ahead window. Consequently, the gear state may be selected on the basis of the instantaneous operating metric or the cumulative or overall operating metric over the course of the route, depending on the configuration of the GSM algorithm.

Operating efficiency may be characterized by the brake specific fuel consumption (BSFC), the brake thermal efficiency (BTE) of the engine, or other suitable metrics under the given operating conditions. For the purpose of this disclosure, drivability may be quantified by various metrics that characterize the operation and performance of the powertrain and generally indicate the smoothness and steadiness of powertrain operation. As non-limiting examples, drivability may include frequency and timing of gear shift events, total number of gear shift events, acceleration capability (e.g., acceleration response within different vehicle speed ranges and/or on different grades), and ability to maintain a given vehicle speed on a given grade. General vehicle performance may also be characterized on the basis of fuel economy (i.e., miles per gallon of fuel consumed) and trip time.

Communication between the hardware components of the GSM system 100, such as the route parameter manager 14, the GSM module 10, and the TCU 18, may be conveyed via a controlled area network (i.e., CAN bus) or any suitable communication protocol. In certain embodiments, the route parameter manager 14 may accept input from a global positioning system (GPS) receiver 16, which can provide the route parameter manager 14 with the route condition information, for example, the current latitude and longitude of the vehicle relative to available data of the terrain of the route. Such terrain data may be stored within a navigation system of the vehicle, may be accessed in real-time via a mobile communication link, or mode available by any suitable means. In certain embodiments, the GPS receiver 16 and route parameter manager 14 may be a part of or separate from the navigation system of the vehicle. Alternatively, the GPS receiver 16 and route parameter manager 14 may be a part of the ECM 12 or may be disposed in a separate control module associated with the vehicle.

In certain embodiments, the route condition information may be provided to the GSM algorithm by an intelligent transportation system (ITS) or similar system. An ITS generally refers to the integration of information and communication technologies with transport infrastructure to improve economic performance, safety, mobility and environmental sustainability. An ITS may include real-time traffic information systems that collect data on traffic conditions, aggregate and translate the data, and disseminate the traffic data through various technologies. Such systems may enable dynamic route grade profiling through vehicle-to-vehicle communications, where grade information from preceding vehicles is provided to the route parameter manager 14. Similarly, vehicles in the proximity of the route may provide speed and gear state information indicative of traffic volume, actual traffic speeds, and other dynamic route condition information that the GSM algorithm may use to adjust the gear state and/or vehicle speed.

For example, the GSM algorithm may determine that it is not desired to increase vehicle speed or change gear state where forward traffic or traffic control devices within the look-ahead window indicate that such changes would necessitate a braking event within a predetermined window. In a further example, where a speed increase or decrease is imminent based on information from the ITS, whether due to traffic, route grade, etc., the GSM algorithm may determine the optimal gear state accordingly. In yet another example, the GSM algorithm may coordinate multiple vehicles via the ITS to improve performance by platooning vehicles and selecting speeds and gear states to improve fuel efficiency and/or drivability of the vehicle fleet with respect to the route conditions. Thus, the route condition information may include data from other vehicles (e.g., via an ITS), and the GSM algorithm may be configured to optimize the aggregate performance of more than one vehicle.

Figure 2:
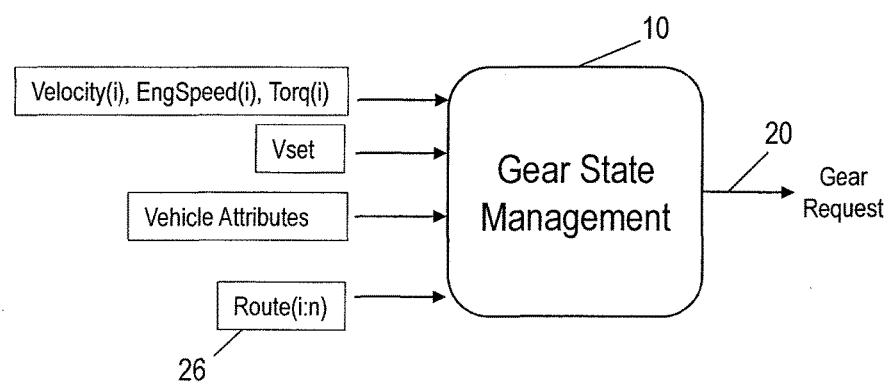
FIG. 2 shows a gear state management module according to an embodiment of the present disclosure.

To illustrate an exemplary embodiment of the GSM algorithm, a block diagram structure will be used to describe how the GSM algorithm dynamically determines the projected engine power and speed requirements and, from these, the desired gear state. FIG. 2 shows an embodiment of the GSM module 10, including exemplary input and output. As shown in FIG. 2, the GSM module 10 may accept and operate upon inputs for the current vehicle operating conditions, including but not limited to the current velocity (Velocity(i)), engine speed (EngSpeed(i)), and engine torque (Torq(i)). The GSM module 10 may accept and operate upon inputs for vehicle characteristics or attributes, such as vehicle mass, wheel radius, rear axle ratio, available gear ratios, motoring curve of the engine 22, and torque curve of the engine 22. The GSM module 10 may further accept and operate upon an isochronous or vehicle set speed (Vset), which may be the speed set by a driver of the vehicle using, for example, conventional vehicle speed control. The vehicle set speed may be referred to as the driver set speed. If no other control algorithm changes the vehicle set speed, the vehicle's speed control may maintain the vehicle set speed as a set point. Alternatively, the GSM algorithm can operate where the fuel or torque control is maintained by the driver.

The GSM module 10 may operate upon the route condition information 26, designated "Route(i:n)" in FIG. 2. The route condition information 26 may comprise a vector or array of the route condition information at the current (i.e., "i") and future (i.e., "n") time steps, where "n" is defined by the number of future time steps within the look-ahead window. The number of time steps may further be defined by the availability and/or resolution of the route condition information 26. Under operating conditions in which no forward route condition information is available, the route condition information 26 may include only the current route information for the current time step. Similarly, velocity, engine speed, and engine torque may be vector quantities for which the notation "(i)" shown in FIG. 2 indicates the current time step. The term vector quantity, as used herein, denotes any suitable collection of elements or values however arranged or structured, for instance, whether scalars, arrays or matrices.

Figure 3:
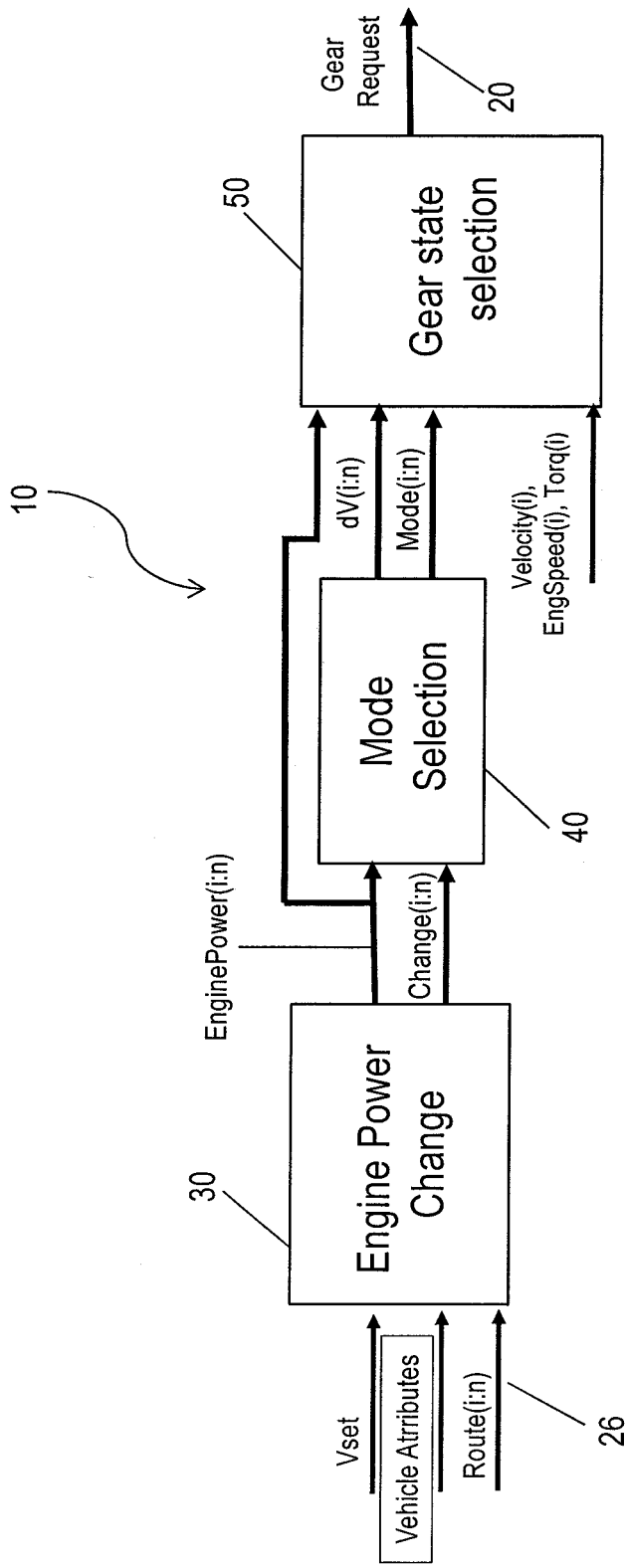
FIG. 3 shows a block diagram of a gear state management module according to an embodiment of the present disclosure.

As shown in FIG. 3, the GSM algorithm, as implemented in the GSM module 10 in certain embodiments, may further include various sub-modules or blocks to operate upon the inputs to generate the gear request 20. In at least one embodiment according to the present disclosure, the GSM module 10 may include an engine power change block 30, a mode selection block 40, and a gear state selection block 50. The engine power change block 30 may be a virtual engine power sensor used to determine the current and future engine power requirements for the route conditions. As non-limiting examples, the engine power change block 30 may determine whether the vehicle is on a pitch, either an incline or decline, or whether an upcoming traffic signal may prompt a change in engine power requirements. Accordingly, the engine power change block 30 may generate a power change vector (designated "Change(i:n)" in FIG. 3) that defines whether a relative change in a given route condition is positive, negative, or neutral relative to a threshold value. For example, as shown in FIG. 4B, where the route condition information 26 includes forward terrain grade information, the engine power change block 30 may generate a hill value vector (designated "Hill(i:n)") that may be defined as 1 for an incline section, 0 for a substantially flat section, and −1 for a decline. The engine power change block 30 may further determine the engine power needed to maintain vehicle speed according to the forward grade included in the route condition information 26. To define the engine power requirements, the engine power change block 30 may generate an engine power vector (designated "EngPower(i:n)") that may be used by the GSM module 10 to determine the gear request 20. In certain embodiments, the engine power vector may include at least the engine speed and torque for the given route conditions.

Figure 4A:
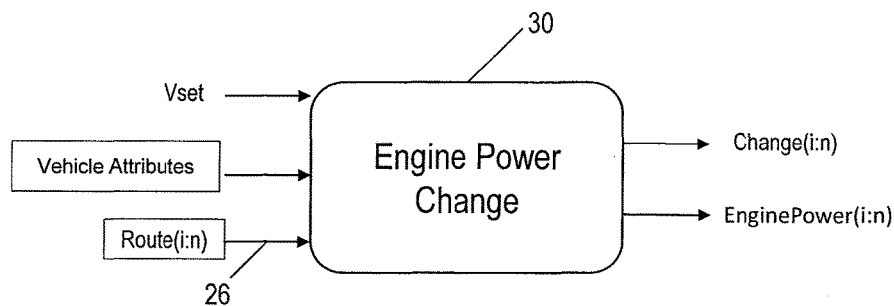
FIG. 4A shows an engine power sensor of a gear state management module according to an embodiment of the present disclosure.
Figure 4B:
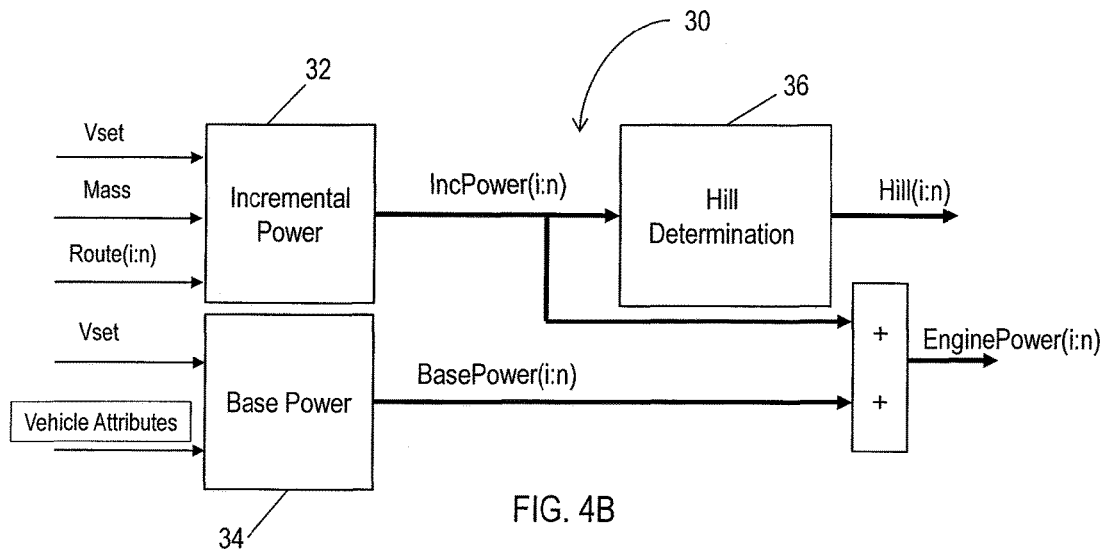
FIG. 4B shows a block diagram of an engine power sensor of a gear state management module according to an embodiment of the present disclosure.

FIG. 4A shows exemplary inputs and outputs of the engine power change block 30. As shown in FIG. 4A, the engine power change block 30 may operate upon such inputs as the Vset value and various vehicle attributes (e.g., vehicle mass, wheel radius, rear axle ratio, available gear ratios, and the motoring and torque curves of the engine 22), in addition to the route condition information 26. The engine power change block 30 may operate on two input conditions depending on the availability of the route condition information 26. Where forward route information is available (i.e., Route(i:n) includes route information through the look-ahead window), the engine power change block 30 will perform calculations for all elements of the Route(i:n) vector. However, in embodiments where only current instantaneous route information is available, the route condition information 26 may include only the current, instantaneous conditions (i.e., current route conditions), and the engine power change block 30 will perform calculations for all elements of the current route condition and hold that value across the length of the vector.

Figure 5A:
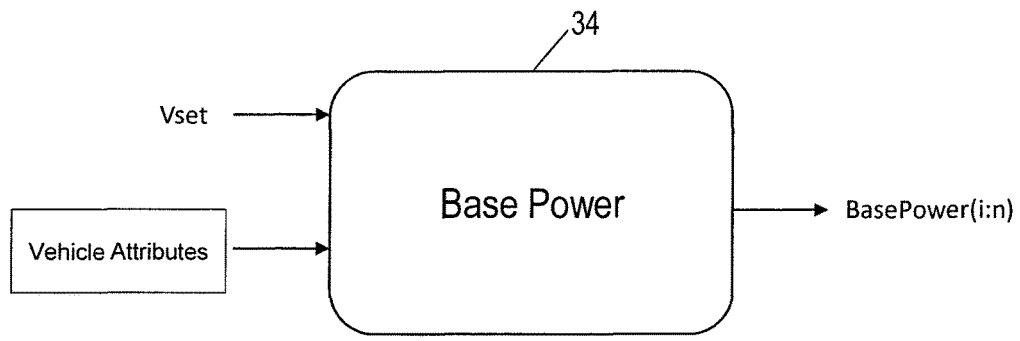
FIG. 5A shows a base power block of a gear state management module according to an embodiment of the present disclosure.

FIG. 4B shows a detailed block diagram of an exemplary structure of the engine power change block 30. In certain embodiments as shown in FIG. 4B, the engine power change block 30 may include an incremental power block 32 and a base power block 34. As shown in FIG. 5A, the base power block 34 may operate on the vehicle set speed and the vehicle attributes such as vehicle mass, wheel radius, rear axle ratio, available gear ratios, and the motoring and torque curves of the engine 22 to generate a base power vector (designated "BasePower(i:n)"), which is the engine power required to maintain a desired vehicle speed under a baseline route condition. For example, where the route condition information 26 includes forward grade information, the base power vector may include the engine required to maintain a desired vehicle speed under a substantially zero grade (i.e., level) condition. In certain embodiments, the base power vector may include the engine speed and torque for the given conditions.

Figure 5B:
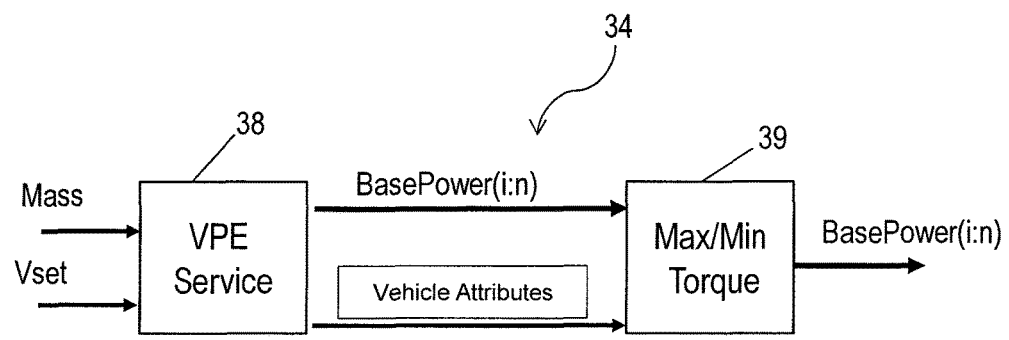
FIG. 5B shows a block diagram of a base power block of a gear state management module according to an embodiment of the present disclosure.

As shown in FIG. 5B, the base power block 34 may include a vehicle parameter estimator (VPE) service call 38. The VPE service call 38 may operate on such inputs as the vehicle mass and the vehicle set speed value to determine various power losses that affect the base power vector. The base power block 34 may further include a max/min torque call 39. The max/min torque call 39 may operate on such inputs as the base power vector and various vehicle attributes to validate that the base power vector generated by the VPE service call 38 is within an acceptable torque range of the engine 22 and transmission 24 and, if not, to adjust the base power vector accordingly. Consequently, the base power block 34 determines the engine power required to maintain a desired vehicle speed under a baseline condition (e.g., a zero grade condition) while applying the power losses of the vehicle and torque limitations of the engine 22.

Figure 6A:
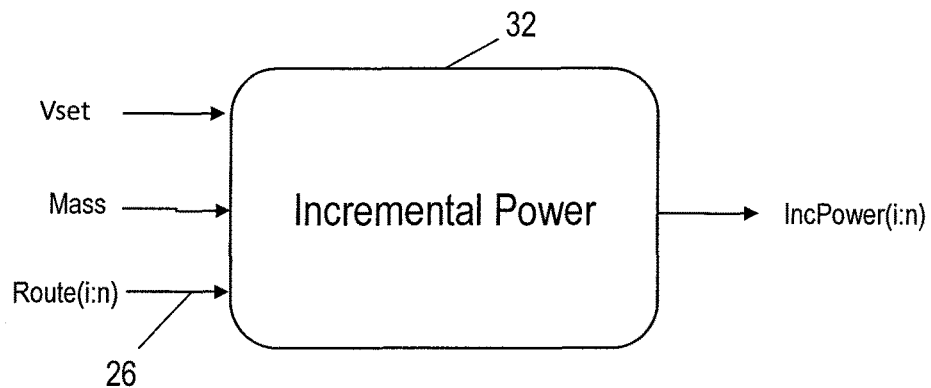
FIG. 6A shows an incremental power block of a gear state management module according to an embodiment of the present disclosure.

As shown in FIG. 6A, the incremental power block 32 may operate upon the vehicle set speed, vehicle mass, and route condition information 26 to generate an incremental power vector (designated "IncPower(i:n)"), which is the incremental engine power needed to maintain the desired vehicle speed under an incremental route condition. The incremental route condition is defined as the extent to which the route condition information 26 differs or deviates from the baseline condition for a given route condition. Where the route conditions exceed the baseline condition, the incremental power vector may indicate that additional engine power is required relative to the base power vector. Conversely, where the route conditions require less power than the baseline condition, the incremental power vector may indicate that lower engine power is required relative to the base power vector. For example, where the route condition information 26 includes grade information, the incremental power vector includes the incremental engine power needed to maintain the desired vehicle speed under the grade condition, whether an incline or a decline. In certain embodiments, the incremental power vector may include the incremental engine speed and torque for the given condition.

As shown in FIG. 4B, the incremental power vector and base power vector may be added to generate the engine power vector, which may include the total engine power needed maintain desired vehicle speed (e.g., the Vset value) under the conditions defined by the route condition information 26. In certain embodiments, the engine power vector may further include the engine speed and torque for the given baseline and incremental conditions, including the future conditions as defined by the route condition information 26.

Figure 6B:
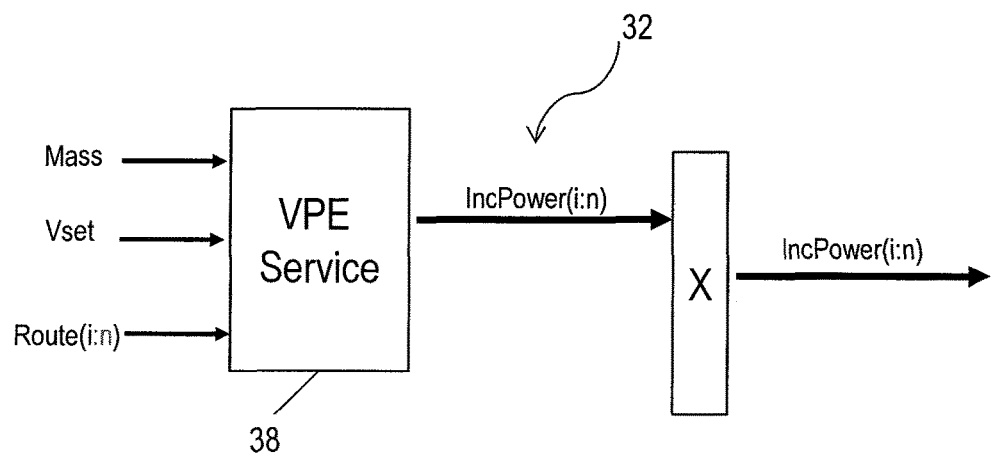
FIG. 6B shows a block diagram of an incremental power block of a gear state management module according to an embodiment of the present disclosure.

As shown in FIG. 6B, the incremental power block 32 may use the VPE service call 38. The VPE service call 38 may operate on such inputs as the vehicle mass, the vehicle set speed, and the route condition information 26 to determine various power losses that affect the incremental power vector and to determine the additional engine power needed to overcome the calculated power losses and maintain the desired vehicle speed under the conditions defined by the route condition information 26. In certain embodiments, the incremental power block 32 may further account for losses attributable to the transmission 24 and final drive of the powertrain. In such an embodiment, the incremental power vector generated by the VPE service call 38 may be divided by a powertrain efficiency factor (designated "C_Trans-FD_Eff" in FIG. 6B) to adjust the incremental power vector. The powertrain efficiency factor effectively translates the engine power required at the wheels of the vehicle to the engine power required from the engine. In certain embodiments, the powertrain efficiency factor may be the product of the transmission efficiency and final drive efficiency. For example, in such an embodiment, the portion of the incremental power vector associated with a change in the grade of the route (designated "GradePower(i:n)") may be calculated as shown in EQ. 1:

$$\text{GradePower}(i{:}n) = (\text{Mass} * \text{gravity} * \sin(\theta) * \text{Velocity}(i)) / (\text{Trans. Eff.} * \text{FD Eff.}) \quad (EQ.1)$$

where Trans. Eff. is the transmission efficiency, FD Eff. is the final drive efficiency, and θ is the pitch or grade of the route from the route condition information 26. Alternatively, instead of using efficiencies, the incremental power vector may be calculated in terms of the power losses associated with the transmission 24 and the final drive. Consequently, the incremental power block 32 may determine the incremental engine power needed to maintain the desired vehicle speed under the conditions defined by the route condition information 26 while applying the power losses associated with the efficiencies and/or losses of the powertrain.

Figure 4C:
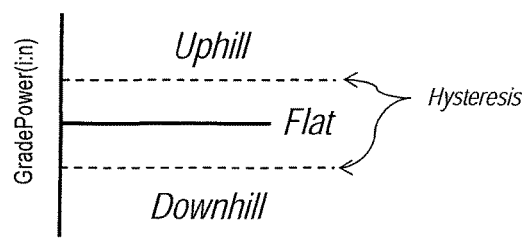
FIG. 4C illustrates the relative response of a hill determination block of a gear state management module according to an embodiment of the present disclosure.

Referring to FIG. 4B, the engine power change block 30 may further include a change state block that defines whether a change of a specific route condition is increasing (i.e., positive), decreasing (i.e., negative), or neutral relative to a threshold value. The specific route condition may be any condition defined in the route condition information 26, either the current route condition or the forward route condition. For example, in embodiments in which the incremental power vector includes the grade power vector (GradePower(i:n)), the change state block may be a hill determination block 36, as depicted in FIG. 4B. In such an embodiment, the hill determination block 36 may compare the incremental power vector generated by the incremental power block 32 against a threshold value to determine the change state, in this example, a hill state (designated "Hill (i:n)"). The hill state defines whether a relative change of elevation of the route is uphill, downhill, or about level (i.e., increasing/positive, decreasing/negative, or neutral). As shown in FIG. 4C, the hill determination block 36 may include hysteresis, represented by the dashed line between each hill condition, with respect to the threshold value and the hill state determination. Accordingly, the change state may include hysteresis with respect to the threshold value and the change state determination. The engine power change block 30 may generate the hill state and the engine power vector using both the incremental power block 32 and the base power block 34. In certain embodiments, the engine power change block 30 may further output the base power vector, incremental power vector, and engine power vector.

Figure 7:
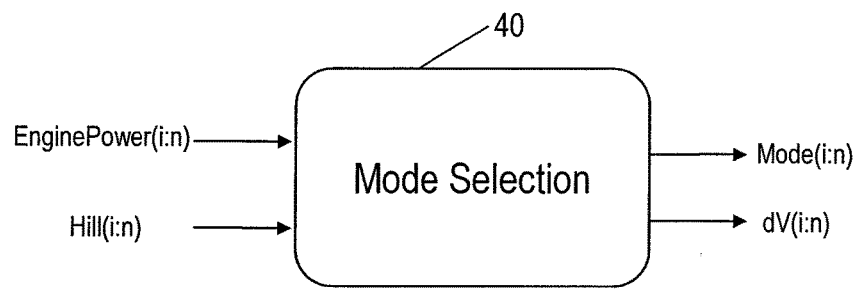
FIG. 7 shows a mode selection block of a gear state management module according to an embodiment of the present disclosure.

According to one aspect of the present disclosure, the GSM module 10 may operate in different modes associated with the change state of a given route condition, referred to as GSM modes. For example, in embodiments in which the incremental power vector includes the grade power vector, the GSM module 10 may operate in one of five modes associated with changes in the grade of the route. In such an embodiment, the GSM modes may include: 1) optimum gear state on a level road; 2) pre-uphill gear state; 3) optimum uphill gear state; 4) pre-uphill gear state; and 5) optimum downhill gear state. The GSM mode may define criteria used to generate the gear request corresponding to a region of optimal operating efficiency for the engine at a given operating condition of the associated GSM mode. For instance, the criteria used to optimize engine operating efficiency on an uphill segment (i.e., GSM mode #3, in the exemplary embodiment) may be different than the appropriate criteria for a pre-uphill segment (i.e., GSM mode #2, in the exemplary embodiment). As shown in FIGS. 3 and 7, the operable GSM mode may be determined by the mode selection block 40 of the GSM module 10 using such inputs as the engine power vector and the hill state. In certain embodiments, the mode selection block 40 may use the base power vector and incremental power vector individually. The mode selection block 40 may generate a mode vector (designated "Mode(i:n)") and a velocity change vector (designated "dV(i:n)"). The mode vector may define the current and future GSM mode based on the current and future hill state.

The velocity change vector may be calculated using the engine power vector as shown in EQ. 2:

$$dV(i{:}n) = (P1 - \text{EngPower}(i{:}n)) * L / (\text{Mass} * \overline{U}^2) \quad (EQ.2)$$

where P1 is the maximum available engine power if the GSM mode is an uphill mode (e.g., modes 2 or 3 as described herein) or the motoring power from the motoring curve if the mode is a downhill mode (e.g., modes 4 and 5), L is the length of the vector, Mass is the mass of the vehicle, and $\overline{U}$ is the average vehicle speed over the vector length, L. The mode selection block 40 generates the velocity change vector to estimate an anticipated loss or gain of vehicle velocity across the engine power vector for a given GSM mode and vehicle speed.

Figure 8:
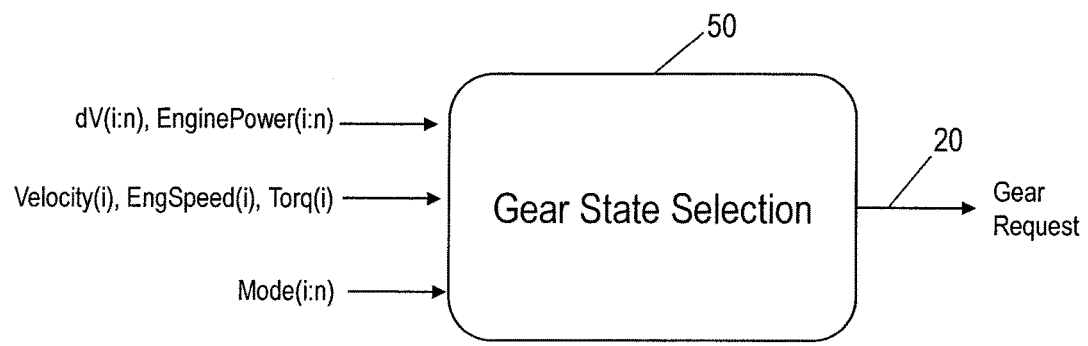
FIG. 8 shows a gear state selection block of a gear state management module according to an embodiment of the present disclosure.

As shown in FIGS. 3 and 8, the gear state selection block 50 of the GSM module 10 may operate upon the products of the engine power change block 30 and the mode selection block 40 to dynamically generate the gear request 20. Specifically, the gear state selection block 50 may operate upon such inputs as the velocity change vector, the engine power vector, the mode vector, and the current velocity, engine speed and torque to generate the gear request 20. In certain embodiments, the gear state selection block 50 may operate on fewer or additional inputs. For example, the gear state selection block 50 may further use one or more calibration parameters to determine the desired gear request 20. As described herein, the engine power vector may include both current and future engine power requirements as determined by the engine power change block 30 (shown in FIG. 4B). The gear state selection block 50 thus determines the desired gear state based upon at least the velocity change vector, the engine power vector, the mode vector, and the current velocity, engine speed and torque. Accordingly, the GSM module 10 at least partially controls the gear state of the transmission 24.

Figure 9:
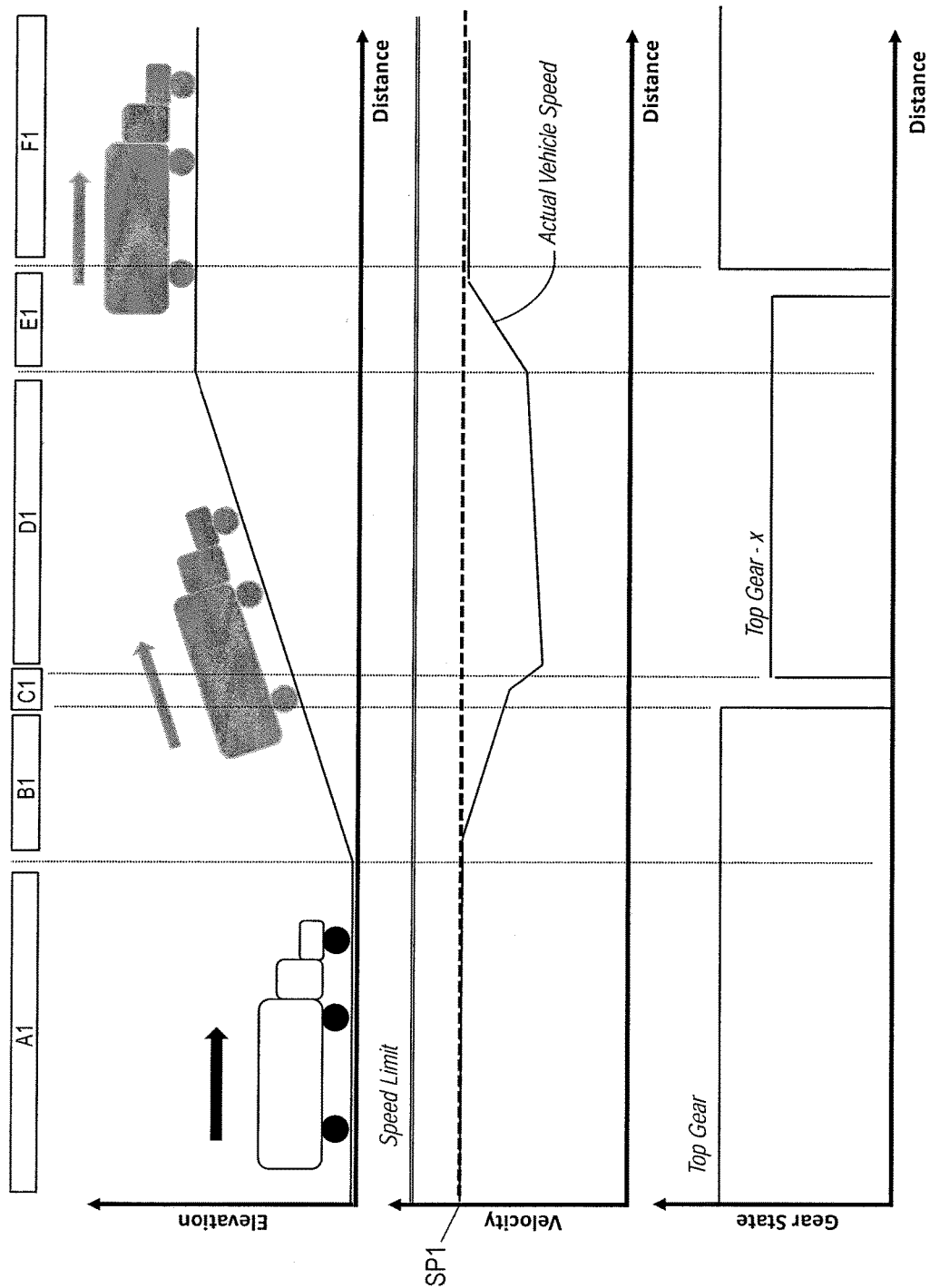
FIG. 9 illustrates the velocity and gear state changes of a vehicle employing a conventional vehicle speed and transmission gear state control in an exemplary driving scenario.

FIG. 9 illustrates the velocity and gear state changes of a vehicle employing conventional vehicle speed and transmission gear state methods as the vehicle transverses an incline. As it approaches the incline (i.e., uphill event), the vehicle travels at a constant velocity per the vehicle speed SP1 set by the driver of the vehicle, depicted in segment A1. As the vehicle begins to climb the incline, its speed drops, depicted in segment B1. Though the vehicle's controller attempts to maintain the vehicle speed SP1, the actual vehicle speed may decrease due to a lack of engine power under the changed grade condition of the incline. Sensing this condition, a conventional engine control unit may request a downshift to gain access to greater engine power, which results in a further decrease in vehicle speed when the transmission shifts gears under the load of the incline, depicted in segment C1. Upon executing the downshift to a lower gear state, the vehicle may begin to regain some of its lost speed, depicted in segment D1, which requires additional engine power for both climbing the incline and the added acceleration of increasing vehicle speed. Upon cresting the incline at the end of the uphill event, the vehicle speed may increase rapidly, as will engine speed (depicted in segment E1), thereby prompting the conventional engine control unit to upshift, depicted in segment F1.

Through the foregoing sequence of segments A1-F1, vehicle speed varies considerably, first because the vehicle is under-powered as the uphill event begins and then because additional speed is lost due to the gear shift during the uphill event, both of which negatively affect drivability and fuel economy. Further, under conventional engine control, the vehicle's fuel economy is degraded because extra power, beyond that needed to climb the incline, is needed to accelerate the vehicle to the set speed SP1 while on the incline. Alternatively, the driver may disengage the controller to manually maintain a certain engine power level; however, such intervention by the driver is not desirable and may negatively affect drivability.

Figure 10:
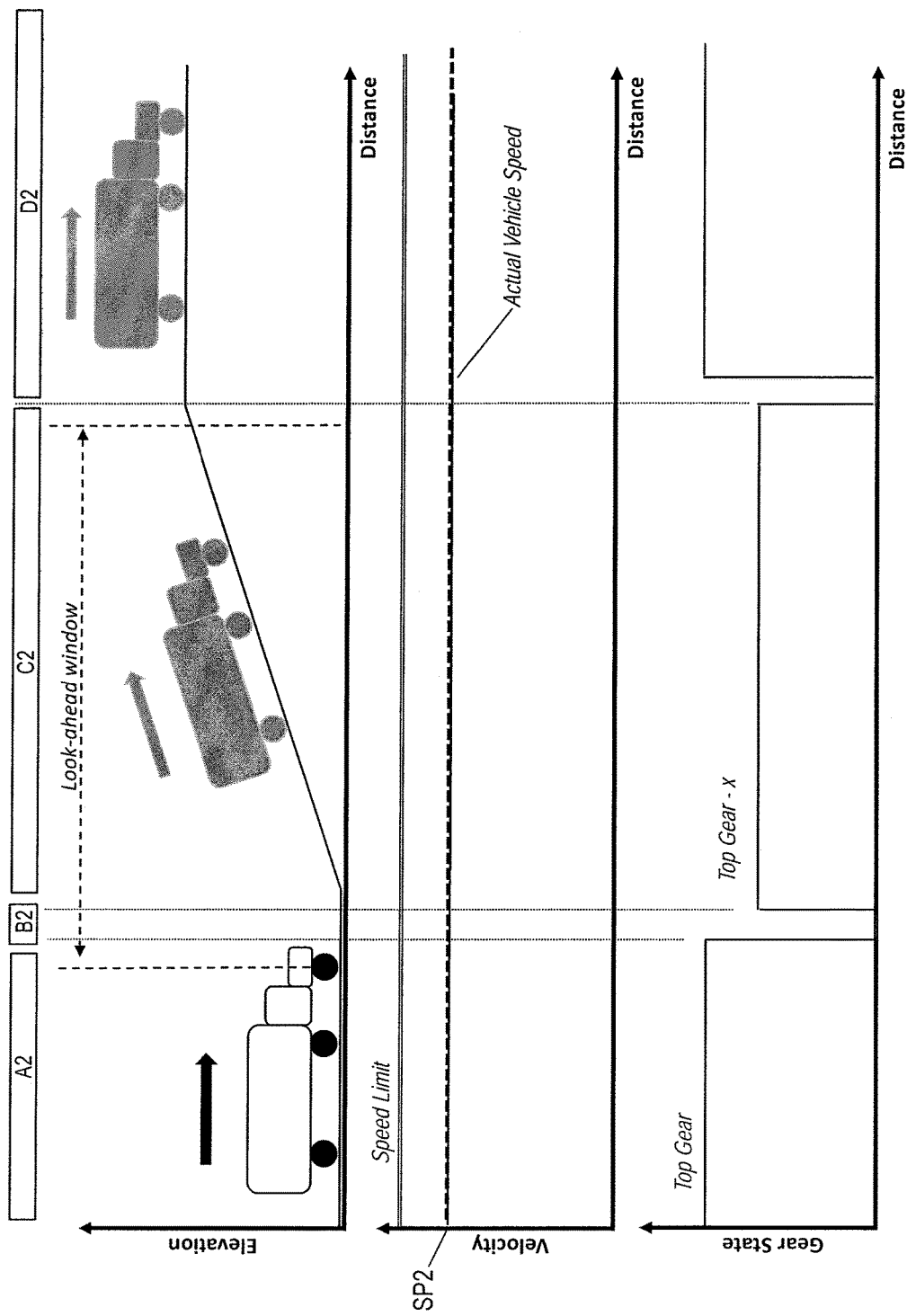
FIG. 10 illustrates the velocity and gear state changes of a vehicle employing a gear state management system according to an embodiment of the present disclosure in an exemplary driving scenario.

FIG. 10 illustrates an exemplary driving scenario in which the GSM algorithm improves vehicle performance, drivability, and fuel economy. Though the following exemplary scenarios specifically demonstrate how the GSM algorithm adjusts gear state and/or vehicle speed in response to changes in the grade of the route provided by the route condition information, the GSM algorithm is not limited to operating upon changes in grade. As will be understood by one skilled in the art having the benefit of the present disclosure, the GSM algorithm may perform similar determinations of gear state and vehicle speed in response to various route conditions that affect engine power requirements as described in detail herein. As shown in FIG. 10, as the vehicle approaches an incline, the vehicle travels at a constant velocity per the vehicle set speed SP2 set by the driver of the vehicle, depicted in segment A2. The GSM algorithm, as implemented via the GSM module 10 for example, interprets route condition information within the look-ahead window. Upon recognizing the approaching incline within the look-ahead window, the GSM algorithm may generate a gear request to preemptively downshift the gear state of the vehicle's transmission to gain access to greater engine power based on the engine power and speed requirements of the current driving conditions and those of the route condition information from the look-ahead window, as described in detail herein and depicted in segment B2. Consequently, the vehicle is able to maintain the vehicle set speed SP2 because the GSM algorithm has determined and requested the proper gear state for incline before uphill event, as depicted in segment C2.

As the vehicle proceeds to climb the incline, the look-ahead window continually shifts along the vehicle's route whereupon the route condition information may indicate that, as in this example, the uphill event ends and the route reaches a relatively level grade. In response, the GSM algorithm, interpreting the change in the route condition information and determining an imminent corresponding change in the engine's power and speed requirements, may generate a gear request to preemptively upshift the gear state of the vehicle's transmission in anticipation of the decreased engine power requirements of the vehicle on the relatively level grade, depicted in segment D2. Thus, using the GSM algorithm, the vehicle is able to maintain the vehicle set speed SP2 throughout the uphill event by using the route condition information to determine impending engine power and speed requirements and to generate the appropriate gear state request accordingly.

The GSM algorithm further enables comparable capabilities during downhill events. Specifically, relative to the prior example, upon identifying an imminent downhill event (i.e., a decline), the GSM algorithm may determine and select a gear state such that the engine operates in the most efficient specific fuel consumption region for the operating conditions. For example, the GSM algorithm may generate a gear request to preemptively upshift the gear state of the vehicle's transmission in anticipation of the decreased engine power requirements of the vehicle during the downhill event. In certain embodiments, the neutral gear state may be selected, and the GSM algorithm may generate a gear request for the transmission to operate in neutral when advantageous to do so. As noted herein, during certain downhill events the parameter P1 of EQ. 2 may be the motoring power from the motoring curve if the mode vector is a downhill mode (e.g., modes 4 and 5). Upon approaching the end of the downhill event, as identified from the route condition information, the GSM algorithm may generate a gear request to preemptively downshift the gear state of the vehicle's transmission in anticipation of the increased engine power requirements of the vehicle on the impending relatively level or increasing grade. Thus, the GSM algorithm enables the vehicle to maintain a nearly constant speed while reducing overall engine power variation during downhill events, as well as uphill events, which improves vehicle performance, drivability, and fuel economy.

Figure 11:
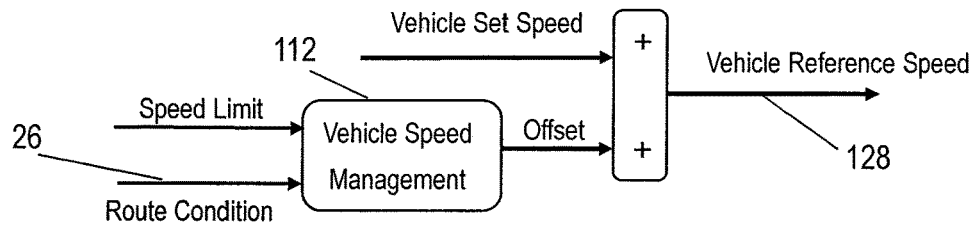
FIG. 11 shows a block diagram of a vehicle speed management module according to an embodiment of the present disclosure.

In another aspect of the present disclosure, an embodiment of the GSM algorithm may purposefully modulate the vehicle's speed about the vehicle set speed (i.e., the isochronous value) to reduce fuel consumption. Rather than managing only the transmission gear state or the vehicle set speed independently from one another, such an embodiment of the GSM algorithm may dynamically optimize vehicle speed and transmission gear state signals in a cooperative manner to improve overall vehicle performance. Such an algorithm may be referred to as a combined vehicle speed and gear state management (CVSGSM) algorithm. The CVSGSM algorithm may include a vehicle speed management algorithm, which in certain embodiments may be implemented as a vehicle speed management (VSM) block 112 as shown in FIG. 11. The VSM block 112 may operate upon various inputs potentially affecting vehicle speed, for example, the route condition information 26 and the local speed limit. In certain embodiments, the VSM block 112 may generate a temporary speed offset that can be combined with the vehicle set speed to generate an interim vehicle reference speed 128, which may be used by the engine control module to adjust the fuel and or air quantity supplied to the engine (i.e., the fuel or air state) on an interim basis, thereby modulating the vehicle speed.

The VSM block 112 may control the vehicle speed within prescribed constraints that can limit the range of modulation, thereby moderating effects on drivability. In at least one embodiment, the VSM block 112 may modulate the vehicle speed such the that route average vehicle speed, which affects the total trip time, is maintained within a given percentage of the vehicle set speed. As one non-limiting example, the VSM block 112 may constrain variance from the vehicle set speed such that the total trip time does not increase by more than a prescribed percentage, which may be calibrated for a configuration of the CVSGSM algorithm. As another example, the VSM block 112 may constrain variance from the vehicle set speed such that the vehicle reference speed 128 may only deviate within a prescribed range from the vehicle set speed, where the prescribed range may be calibrated for a configuration of the CVSGSM algorithm. In certain embodiments, the rate of change of the vehicle reference speed may be limited to ensure desired drivability characteristics of the vehicle are maintained while reducing fuel consumption.

Figure 12A:
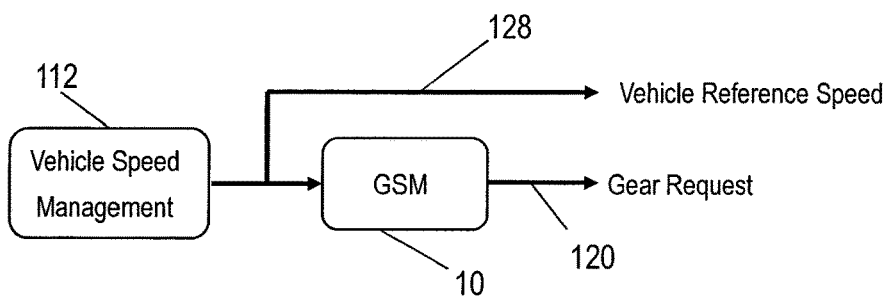
FIG. 12A shows a block diagram of a combined vehicle speed and gear state management system integrated in series according to an embodiment of the present disclosure.
Figure 12B:
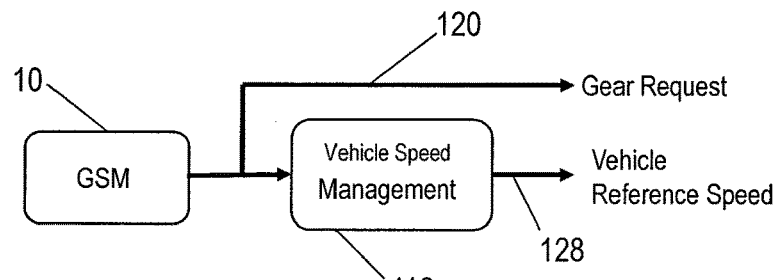
FIG. 12B shows an alternative block diagram of a combined vehicle speed and gear state management system integrated in series according to an embodiment of the present disclosure.

In at least one embodiment, the CVSGSM algorithm may combine the functions of VSM block 112 and with the GSM module 10 to yield a combined vehicle speed and gear state management system. In such an embodiment, the VSM block 112 may generate the vehicle reference speed 128 cooperatively with the gear state selection of the GSM module 10 to enable improved overall vehicle performance, drivability, and fuel economy. The VSM block 112 may be combined with the GSM module 10 in various configurations. According to one embodiment as shown in FIG. 12A, the VSM block 112 and GSM module 10 may be integrated in series such that the VSM block 112 provides input to the GSM module 10. In such an embodiment, the VSM block 112 may generate the vehicle reference speed 128 as described herein and communicate the same to the GSM 10, which in turn generates a gear request 120 based, at least in part, on the vehicle reference speed 128 generated by the VSM block 112. Alternatively, as shown in FIG. 12B, the VSM block 112 and GSM module 10 may be integrated in series such the GSM module 10 provides input to the VSM block 112. In such an embodiment, the GSM module 10 may generate the gear request 120 as described herein and communicate the same to the VSM block 112, which in turn generates the vehicle reference speed 128 based, at least in part, on the gear request 120 generated by the GSM module 10.

Figure 12C:
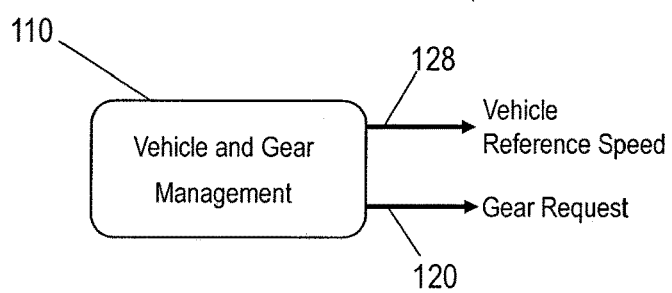
FIG. 12C shows a block diagram of a combined vehicle speed and gear state management system integrated in parallel according to an embodiment of the present disclosure.
Figure 13:
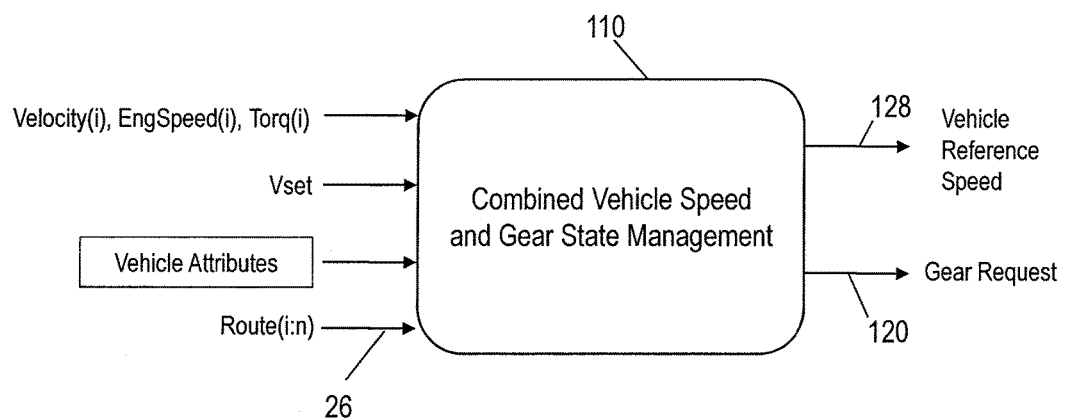
FIG. 13 shows a combined vehicle speed and gear state management module according to an embodiment of the present disclosure.

In at least one embodiment, as shown in FIG. 12C, the VSM block 112 and GSM module 10 may be integrated in parallel in a combined vehicle speed and gear state management (CVSGSM) module 110 configured to generate both the gear request 120 and the vehicle reference speed 128 concurrently. As shown in FIG. 13, the CVSGSM module 110 may accept and operate upon inputs for the current vehicle operating conditions, including but not limited to the current velocity (Velocity(i)), engine speed (EngSpeed(i)), and engine torque (Torq(i)). The CVSGSM module 110 may accept and operate upon inputs for vehicle attributes, including but not limited to vehicle mass, wheel radius, rear axle ratio, available gear ratios, motoring curve of the engine, and torque curve of the engine. The CVSGSM module 110 may further operate upon the route condition information 26, and the CVSGSM module 110 may accept and operate upon an isochronous or vehicle set speed (Vset). In such an embodiment, the CVSGSM module 110 may include an operation, such as is shown in FIG. 11, in which the VSM block 112 operates upon such inputs as the route condition information 26 to generate a speed offset that is combined with the vehicle set speed to generate a vehicle reference speed 128. Using the exemplary information inputs described, the CVSGSM module 110 may generate the gear request 120 and the vehicle reference speed 128

Figure 14:
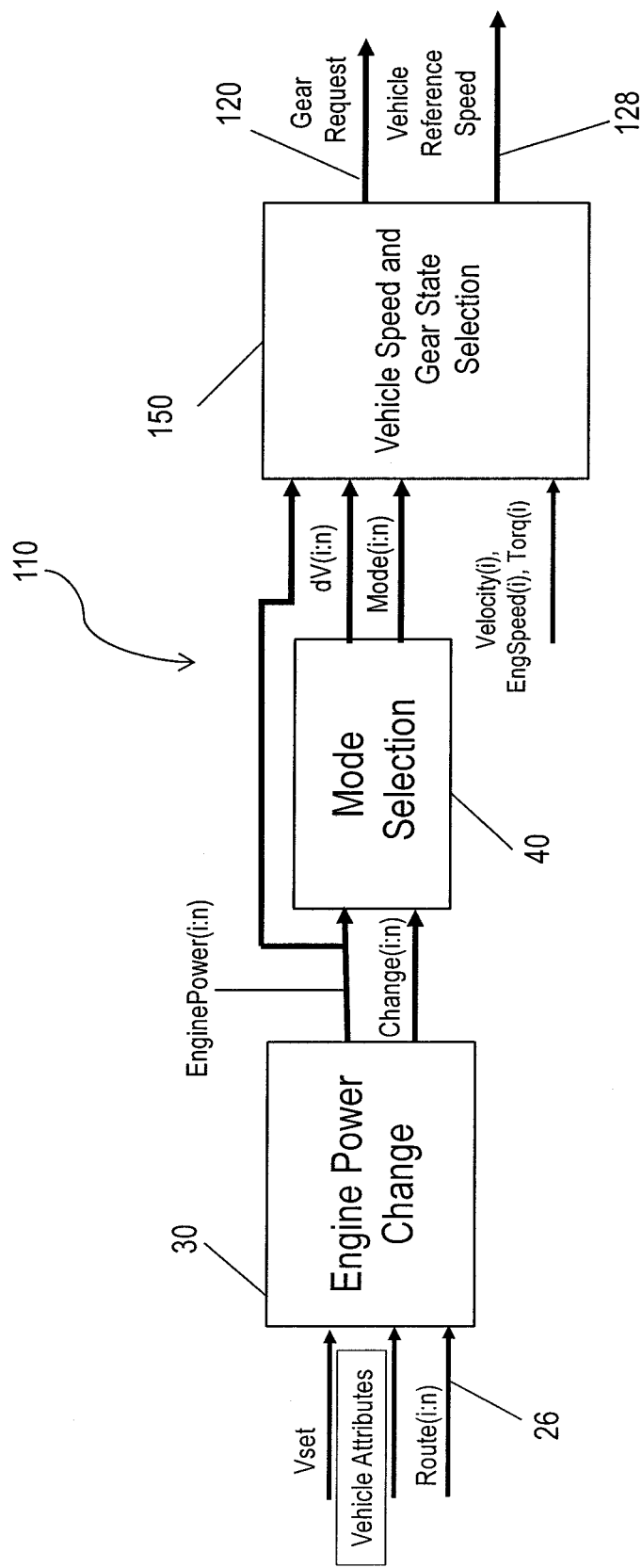
FIG. 14 shows a block diagram of a combined vehicle speed and gear state management module according to an embodiment of the present disclosure.

FIG. 14 shows a block diagram of an embodiment of the CVSGSM module 110. As shown in FIG. 14, the CVSGSM module 110 may include the engine power change block 30, the mode selection block 40, and a vehicle speed and gear state selection block 150. The engine power change block 30 and mode selection block 40 may be configured and operate as described herein with respect to the GSM module 10. Specifically, the engine power change block 30 may operate upon such inputs as the Vset value and vehicle attributes such as vehicle mass, wheel radius, rear axle ratio, available gear ratios, and the motoring and torque curves of the engine, in addition to the route condition information 26. The engine power change block 30 may determine the engine power needed to maintain vehicle speed within the prescribed constraints of the CVSGSM algorithm. Accordingly, the engine power change block 30 may generate a power change vector and an engine power vector that may be communicated to the mode selection block 40. The engine power vector may further be communicated to the vehicle speed and gear state selection block 150 as shown in FIG. 14. As a module within the CVSGSM module 110, the mode selection block 40 may determine the GSM mode and appropriate optimization criteria using such inputs as the engine power vector and the change state. In certain embodiments, the mode selection block 40 may generate a mode vector and a velocity change vector, as described in detail with respect to the GSM module 10, and communicate the same to the vehicle speed and gear state selection block 150.

Figure 15:
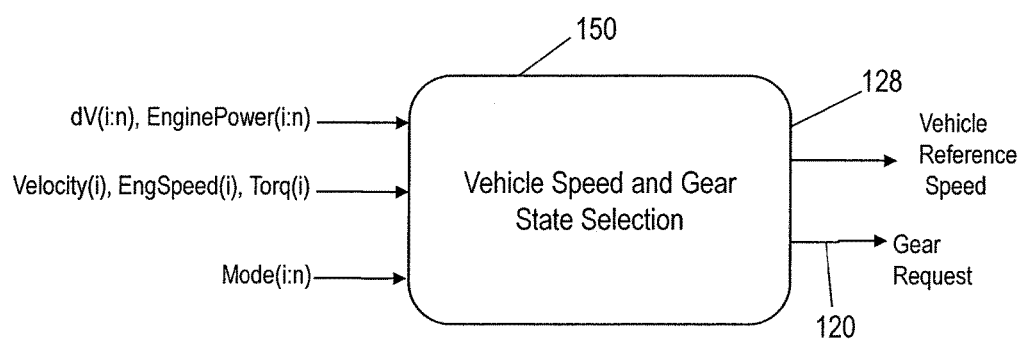
FIG. 15 shows a combined vehicle speed and gear state selection block of a combined vehicle speed and gear state management module according to an embodiment of the present disclosure.

As shown in FIG. 15, the vehicle speed and gear state selection block 150 of the CVSGSM module 110 may dynamically operate upon such inputs as the velocity change vector, the engine power vector, the mode vector, and the current velocity, engine speed and torque to generate both the gear request 120 and the vehicle reference speed 128. In certain embodiments, the vehicle speed and gear state selection block 150 may operate on fewer or additional inputs. For example, the vehicle speed and gear state selection block 150 may further use one or more calibration parameters to determine the desired gear request 120 and/or vehicle reference speed 128. As described herein, the engine power vector may include both current and future engine power requirements as determined by the engine power change block 30 (shown in FIG. 4B). The vehicle speed and gear state selection block 150 thus determines the desired gear state based upon at least the velocity change vector, the engine power vector, the mode vector, and the current velocity, engine speed and torque. The vehicle speed and gear state selection block 150 may further determine the vehicle reference speed 128 corresponding to the gear request 120 with the parameters and/or constraints of the CVSGSM algorithm.

Figure 16:
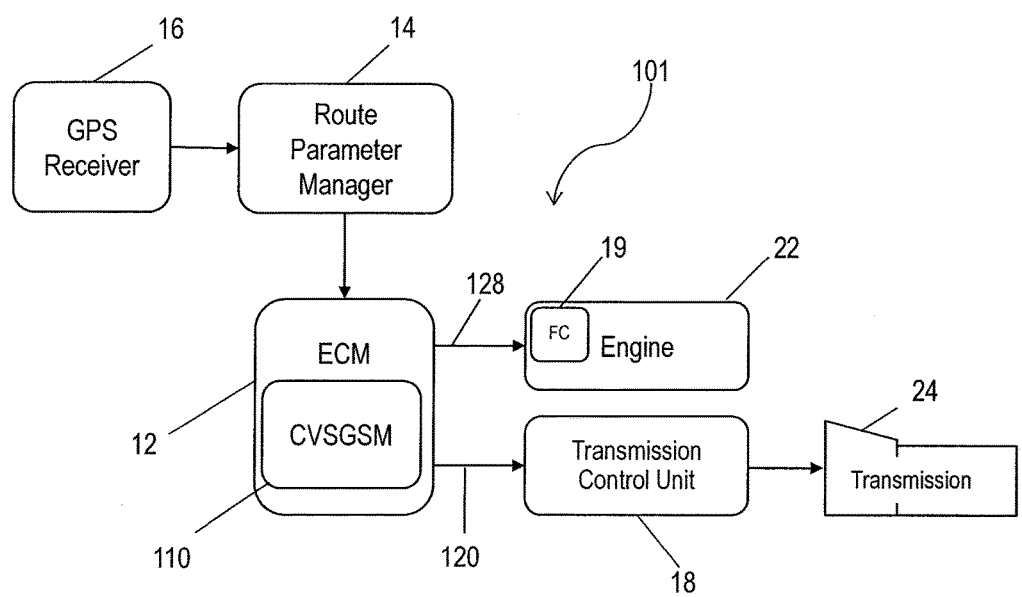
FIG. 16 shows a block diagram of an alternative gear state management system according to an embodiment of the present disclosure.

As shown in FIG. 16, the CVSGSM module 110 may be employed in an alternative embodiment of a GSM system 101, which may include the GPS receiver 16, the route parameter manager 14, and the ECM 12, each of which may be configured and operate as described with respect to the GSM system 100 shown in FIG. 1. Referring to FIG. 16, upon selection of the desired gear state, the CVSGSM module 110 may communicate the gear request 120 to the TCU 18. The TCU 18 subsequently interrogates the gear request 120 and, if the TCU 18 determines it is safe or efficient to do so under the current vehicle and engine operating conditions, the TCU 18 may generate a gear command to the transmission 24 to shift to a gear state according to the gear request 120.

Further, the CVSGSM module 110 may communicate the determined vehicle reference speed 128 to a fuel control 19 included in the engine 22. In certain embodiments, the fuel control 19 may be included in the ECM 12. The fuel control 19 subsequently interrogates the vehicle reference speed 128 and, if the fuel control 19 determines it is safe or efficient to do so under the current vehicle and engine operating conditions, the fuel control 19 may generate a fuel command to the engine 22 to adjust the fuel state of the engine 22, thus affecting its speed and the speed of the vehicle. In certain embodiments, the fuel control 19 may include an air control to regulate the mass of air flowing into the engine 22. In such embodiments, the fuel control 19 may generate an air command to the engine 22 to adjust the air state of the engine 22, thus affecting its speed and the speed of the vehicle. Accordingly, the CVSGSM module 110 may control both the gear state of the transmission 24 and the speed of the vehicle (via the speed of the engine 22 at the selected gear state) in concert with each other to improve performance, drivability, and/or fuel economy of the vehicle over what is achievable by controlling gear state and engine speed separately.

Figure 17:
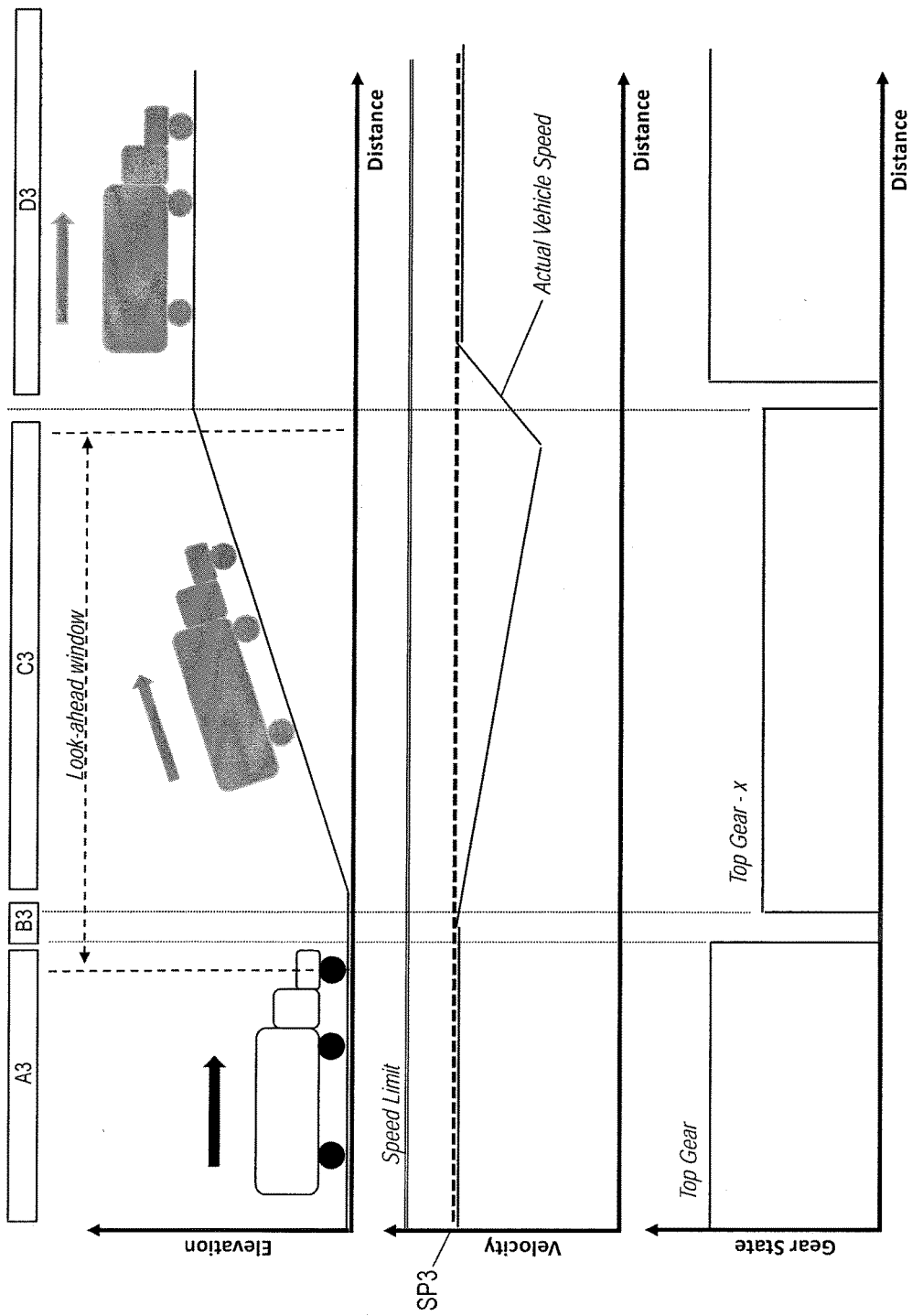
FIG. 17 illustrates the velocity and gear state changes of a vehicle employing an alternative gear state management system according to an embodiment of the present disclosure in an exemplary driving scenario.

FIG. 17 illustrates an exemplary driving scenario in which the CVSGSM algorithm dynamically adjusts both the vehicle speed and gear state to improve vehicle performance, drivability, and fuel economy. As with respect to the example driving scenario of FIG. 10, though the following exemplary scenario specifically demonstrates how the CVSGSM algorithm adjusts gear state and/or vehicle speed in response to changes in the grade of the route provided by the route condition information, the CVSGSM algorithm is not limited to operating upon changes in grade. As will be understood by one skilled in the art having the benefit of the present disclosure, the CVSGSM algorithm may perform similar determinations of gear state and vehicle speed in response to various route conditions that affect engine power requirements as described in detail herein. As shown in FIG. 17, as the vehicle approaches an incline, the vehicle travels at a constant velocity per the vehicle set speed SP3 set by the driver of the vehicle, depicted in segment A3. The CVSGSM algorithm, as implemented via the CVSGSM module 110 for example, interprets route condition information within the look-ahead window. Upon recognizing the approaching incline within the look-ahead window (i.e., the uphill event), the CVSGSM algorithm may generate a gear request to preemptively downshift the gear state of the vehicle's transmission to gain access to greater engine power based on the engine power and speed requirements of the current driving conditions and those provided by the route condition information through the look-ahead window, as described in detail herein and depicted in segment B3.

Further, upon recognizing the uphill event, the CVSGSM algorithm may generate an interim vehicle reference speed, different from the vehicle set speed SP3, that allows the vehicle to temporarily decelerate during at least a portion of the uphill event such that the engine operates in a region of greater efficiency, for example, as measured by BSFC or BTE and as depicted in segment C3. The CVSGSM algorithm may determine the gear request and the vehicle reference speed with respect to one another in addition to using the engine power and speed requirements of the current driving conditions and those of the route condition information from the look-ahead window. Consequently, the CVSGSM algorithm, using criteria associated with its constituent modules, may determine that the desired combination of gear state and vehicle speed is one that provides adequate engine power but reduces vehicle speed within an acceptable range to improve fuel economy while maintaining drivability and vehicle performance over the course of the overall route.

As the vehicle proceeds to climb the incline, the look-ahead window continually shifts along the vehicle's route whereupon the route condition information may indicate that, as in this example, the uphill event ends and the route reaches a relatively level grade. In response, the CVSGSM algorithm, interpreting the change of grade from the route condition information and determining a corresponding change in the engine's power and speed requirements, may generate a gear request to preemptively upshift the gear state of the vehicle's transmission in anticipation of the decreased engine power requirements of the vehicle on the relatively level grade. Upon interpreting and recognizing the impending change in grade, the CVSGSM algorithm may further determine that the vehicle reference speed should be adjusted to approach the vehicle set speed SP3, thereby causing the vehicle to accelerate until the vehicle speed approaches or attains the vehicle set speed SP3 as depicted in segment D3 of FIG. 17. By preemptively commanding vehicle acceleration prior to the end of the uphill event (i.e., cresting the hill), the CVSGSM algorithm may reduce the effect of the change of vehicle reference speed on the total trip time. Alternatively, under certain operating and grade conditions, the CVSGSM algorithm may not adjust the vehicle reference speed to the vehicle set speed SP3 until the route has actually reached a relatively level grade, thereby avoiding accelerating the vehicle during the uphill event, which could increase fuel consumption and reduce fuel economy.

In certain embodiments and under certain conditions, though not illustrated in the example depicted in FIG. 17, at a point during the uphill event the CVSGSM algorithm may determine that further deceleration is not desired and may then increase the fuel and/or air to at least maintain a constant vehicle speed. Such a determination may be the result of the vehicle slowing until a lower speed constraint is reached or because the CVSGSM algorithm determines that, based on the route condition information, further deceleration is not the most efficient operating strategy.

The CVSGSM algorithm may further adjust the gear and fuel/air states during downhill events. Specifically, upon identifying an impending downhill event, the CVSGSM algorithm may determine and select a gear state and a fuel/air state such that the engine operates in the region of greatest efficiency (e.g., BSFC or BTE) for the current grade requirements or for the cumulative route conditions. For example, the CVSGSM algorithm may generate a gear request to preemptively upshift the gear state of the vehicle's transmission in anticipation of the decreased engine power requirements of the vehicle during the downhill event. In certain embodiments, the neutral gear state may be selected, and the CVSGSM algorithm may generate a gear request for the transmission to operate in neutral when advantageous to do so.

Upon approaching the end of the downhill event, as identified from the route condition information, the CVSGSM algorithm may generate a gear request to pre-emptively downshift the gear state of the vehicle's transmission in anticipation of the increased engine power requirements of the vehicle on the impending relatively level or increasing grade. Further, the CVSGSM algorithm may adjust the vehicle reference speed above the vehicle set speed, enabling the vehicle to gain additional momentum ahead of the change of grade. Consequently, the CVSGSM algorithm enables coordinated engine and transmission control to achieve a desired balance of vehicle performance, drivability, and fuel economy by selecting the gear state of the transmission and the engine speed based on the engine power and speed requirements under current and future route conditions.

The GSM and CVSGSM block diagram architectures outlined herein provide the signals and flexibility for the GSM and CVSGSM algorithms to request gear shifts and select vehicle speeds in an optimum manner. The optimum manner may be customized through calibration parameters to optimize a performance metric or metrics using criteria developed for various route conditions. Performance metrics may include, without being limited to, fuel economy, trip time, ability to maintain vehicle set speed on various grades, acceleration response over ranges of speed and grade, and number and frequency of shift events. Route conditions may include, without being limited to, uphill and downhill grade, weather conditions, traffic conditions, traffic control signs and signals and their location, and speed limits. The optimum manner and calibration may be determined offline, for example in an engineering laboratory setting, through optimization routines such as dynamic programming.

In certain embodiments, the ECU 12 includes one or more modules structured to functionally execute the operations of the ECU 12. The description herein including modules emphasizes the structural independence of the aspects of the ECU 12, and illustrates one grouping of operations and responsibilities of the ECU 12. Other groupings that execute similar overall operations are understood within the scope of the present disclosure. Modules may be implemented in hardware and/or software on a non-transient computer readable storage medium, and modules may be distributed across various hardware or software components.

The ECU 12 may be structured to control command parameters of the vehicle powertrain, including the engine 10 and/or the transmission 24. In certain embodiments, the ECU 12 may be a portion of a processing subsystem including one or more computing devices having memory, processing, and communication hardware. The ECU 12 may be a single device or a distributed device, and the functions of the ECU 12, including those of the GSM module 10, may be performed by hardware or software. The ECU 12 may comprise digital circuitry, analog circuitry, or a hybrid combination of both of these types. The ECU 12 may include one or more Arithmetic Logic Units (ALUs), Central Processing Units (CPUs), memories, limiters, conditioners, filters, format converters, or the like which are not shown to preserve clarity.

Further, the ECU 12 may be programmable, an integrated state machine, or a hybrid combination thereof. In at least one embodiment, the ECU 12 is programmable and executes algorithms and processes data in accordance with operating logic that is defined by programming instructions such as software or firmware. Alternatively or additionally, operating logic for the ECU 12 may be at least partially defined by hardwired logic or other hardware. It should be appreciated that the ECU 12 may be exclusively dedicated to controlling the vehicle powertrain or may further be used in the regulation, control, and/or activation of one or more other subsystems or aspects of the vehicle.

As is evident from the figures and description presented herein, a variety of embodiments according to the present disclosure are contemplated. An aspect of the present disclosure is a method including an operation of determining an engine power requirement for an engine of a vehicle based on route information, the engine power requirement comprising a base power and an incremental power, where the base power includes the engine power required to maintain a vehicle speed under a baseline route condition and the incremental power includes the incremental engine power required to maintain the vehicle speed under the route information differing from the baseline route condition, and wherein the route information includes at least a portion of a route to be traveled by the vehicle. The method further includes determining a projected change of the vehicle speed based on the engine power and generating a gear request based on the engine power and the projected change of vehicle speed, wherein the gear request defines a gear state of a transmission connected to the engine such that the engine operates in or near a region of best efficiency per the engine power over at least a portion of the route. The method further includes communicating the gear request to the transmission.

In certain embodiments of the method, the route information includes a current route condition and a forward route condition for at least a portion of the route defined by a data window, where the current route condition includes route information at the vehicle's current location and the forward route condition includes route information through the data window. The route information includes at least one of a grade of the route, traffic conditions, location and type of traffic control signs and signals, posted and effective speed limits, and environmental conditions, including precipitation and wind conditions within the data window. In exemplary embodiments, the engine power is further based on attributes of the engine and the vehicle. In the method, the vehicle attributes include at least one of the vehicle mass, wheel radius, rear axle ratio, available gear ratios of the transmission, motoring curve of the engine, and torque curve of the engine. In a particular embodiment, the gear request is communicated to a controller for the transmission and the controller operates upon the gear request to change the gear state of the transmission if appropriate. In another aspect, the method comprising determining a change state of the current route condition and/or the forward route condition based on the incremental power, where the change state defines whether a relative change in the route is positive, negative, or neutral relative to a threshold value, and determining a mode based on the engine power and the change state, wherein the mode at least partially defines criteria used to generate the gear request, wherein the gear request is further based on the mode and the criteria.

One exemplary embodiment of the method includes determining a hill state based on the incremental power relative to a threshold value, wherein the hill state defines whether a relative change in the grade of the route is uphill, downhill, or about level and, further, determining a mode based on the engine power and the hill state, wherein the mode at least partially defines criteria used to generate the gear request, wherein the gear request is further based on the mode and the criteria. In certain embodiments of the method, the criteria include optimizing the brake specific fuel consumption and/or the brake thermal efficiency of the engine for the engine power over at least a portion of the route. In certain embodiments, the engine power is a vector quantity that includes an engine speed, and/or the route condition, forward route condition, engine power, and projected change of vehicle speed are vector quantities. In such an embodiment, the incremental power, base power, hill state, and mode are vector quantities. In at least one embodiment, the gear request may be further based on an engine speed and an engine torque.

Another exemplary embodiment of the method includes generating a reference speed based on the engine power and the projected change of vehicle speed such that the reference speed may deviate from the vehicle speed, and communicating the reference speed to an engine controller, wherein the engine controller operates upon the reference speed to change the vehicle speed to be at or near the reference speed.

Another aspect of the present disclosure is an apparatus including a gear state module structured to control the gear state of a transmission connected to an engine of a vehicle, the gear state module structured to interpret route condition information for a route and a prescribed vehicle speed. The gear state module further determines an engine power vector, the engine power vector defining the desired engine power required to substantially maintain the prescribed vehicle speed. Moreover, the gear state module selects a gear state for the transmission such that the engine operates at or near a region of best efficiency over the engine power vector for at least a portion of the route and, further, communicates the gear state to the transmission, where the grade information includes elevation data of at least a portion of a terrain to be traversed by the vehicle at or near the vehicle speed. In at least one embodiment, the gear state module includes an engine power sensor structured to generate the engine power vector, the engine power sensor including a base power block and an incremental power block, wherein the base power block is configured to calculate a base power vector, the base power vector including a portion of the engine power vector needed to power the vehicle at or near the prescribed vehicle speed under a baseline route condition, and wherein the incremental power block is configured to calculate an incremental power vector, the incremental power vector including the portion of the engine power vector needed to power the vehicle at or near the prescribed vehicle speed under a deviation of the current route condition and the forward route condition from the baseline route condition, and the engine power sensor further including a change state block structured to generate a power change vector, the power change vector defining a relative change in the current route condition and the forward route condition, where the engine power sensor adds the base power vector and the incremental power vector to generate the engine power vector. In such an embodiment, the base power block includes a first vehicle parameter estimator service call configured to operate on a mass of the vehicle and the prescribed vehicle speed to generate the base power vector. In one embodiment, the incremental power block includes a second vehicle parameter estimator service call configured to operate on a mass of the vehicle, the vehicle speed, and the route condition information to generate the incremental power vector, wherein the incremental power block further adjusts the incremental power vector by a powertrain efficiency.

In a particular embodiment, the gear state module further includes a mode selection block structured to operate on the engine power vector and the power change vector to generate a mode vector and a speed change vector, wherein the mode vector defines criteria by which to select the gear state, and wherein the speed change vector defines an estimated change of vehicle speed associated with the engine power vector and the mode vector. In such an embodiment, the gear state module further includes a gear selection block structured to operate on the engine power vector, the speed change vector, and the mode vector to generate the gear state according to the criteria such that the engine operates at or near a region of best efficiency over the engine power vector, wherein the gear selection block is further structured to communicate the gear state to the transmission. In at least one embodiment, the gear state module communicates the gear state to the transmission via a transmission controller structured to interrogate and implement the gear state, wherein the prescribed vehicle speed is a speed set by an operator of the vehicle, a current vehicle speed, or an interim speed determined by the gear state module.

In certain embodiments, the gear state module is further structured to control the vehicle speed, the gear state module structured to select an interim vehicle speed and the gear state for the transmission such that the engine operates at or near a region of best efficiency over at least a portion of the route; and to communicate the interim vehicle speed to a fuel control of the engine. In such an embodiment, the gear state module enables the interim vehicle speed to deviate from the vehicle speed within prescribed limits. In an embodiment, the prescribed limits include a prescribed percentage of the vehicle speed or a prescribed speed range about the vehicle speed. In another embodiment, the route condition information includes grade data for at least a portion of the route, the base power vector includes the engine power needed to power the vehicle at or near the prescribed vehicle speed on a substantially level grade, the incremental power vector includes engine power needed to power the vehicle at or near the prescribed vehicle speed on a pitch defined by the grade data, the change state block generates a hill vector, and the hill vector defining a relative pitch of the grade data.

Yet another aspect of the present disclosure is a system including an engine for a vehicle, a transmission mechanically coupled to the engine, a source of route information, the route information including current and forward route conditions of at least a portion of a route route the vehicle traveling at or near a vehicle speed, and a controller structured to determine a desired gear state of the transmission for the route by operating on the route information to determine engine power requirements through a period defined by the route information, the controller configured to interpret the route information and the vehicle speed; to determine a engine power, the engine power defining a desired power from the engine in response to the grade information and an anticipated change in the vehicle speed; to select a gear state for the transmission such that the engine operates at or near a region of best efficiency over the period through at least a portion of the route; and to communicate the gear state to the transmission.

In certain embodiments, the transmission includes a transmission controller structured to interrogate the gear state communicated by the controller and to implement the gear state if appropriate. In an embodiment, the controller is further structured to control the vehicle speed and configured to select an interim vehicle speed and the gear state for the transmission such that the engine operates at or near a region of best efficiency over the period through at least a portion of the route; and to communicate the interim vehicle speed to the engine. In such an embodiment, the engine includes an engine controller structured to interrogate the interim vehicle speed communicated by the controller and to implement the interim vehicle speed via a fuel control. In certain embodiments, the controller comprises a gear state module. In such an embodiment, the controller further comprises a engine power change block configured to determine the engine power using an incremental power block and a base power block, a mode selection block configured to determine the anticipated change in the vehicle speed, and/or a gear state selection block configured to determine the gear state from the engine power and the anticipated change in vehicle speed.

As will be understood by one skilled in the art having the benefit of the present disclosure, the terms used to identify the components of the systems and methods disclosed herein may be similarly described by other terms unless explicitly provided to the contrary. While various embodiments of an engine and transmission control system and methods for using the same have been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected. A variety of further embodiments according to the present disclosure are contemplated. Those skilled in the art will appreciate that many modifications are possible in the example embodiments without materially departing from this disclosure. Accordingly, all such modifications are intended to be included within the scope of this disclosure as defined in the following claims.

What is claimed is:

1. A method comprising:
   determining a projected engine power requirement for an engine of a vehicle based on route information, the projected engine power requirement comprising a base power and an incremental power, wherein the base power includes an engine power required to maintain a vehicle speed under a baseline route condition and the incremental power includes an incremental engine power required to maintain the vehicle speed under the route information differing from the baseline route condition, and wherein the route information includes at least a portion of a route to be traveled by the vehicle;
   determining a projected change of the vehicle speed based on the projected engine power requirement;
   generating a gear request based on the projected engine power requirement and the projected change of vehicle speed, wherein the gear request defines a gear state of a transmission connected to the engine such that at least one of the vehicle's drivability, trip time and fuel economy are improved over at least a portion of the route;
   communicating the gear request to a controller for the transmission, wherein the controller is operable upon the gear request to change the gear state of the transmission if appropriate;
   generating a vehicle speed offset based on the route information that is combined with the vehicle speed to form an interim vehicle reference speed; and
   modulating the vehicle speed about a vehicle set speed based on the interim vehicle reference speed to adjust at least one of vehicle's fuel or air state to the engine.

2. The method of claim 1, wherein the route information includes a current route condition and a forward route condition for at least a portion of the route defined by a data window, wherein the current route condition includes route information at the vehicle's current location and the forward route condition includes route information through the data window.

3. The method of claim 2, wherein the route information includes at least one of a grade of the route, traffic conditions, location and type of traffic control signs and signals, posted and effective speed limits, and environmental conditions, including precipitation and wind conditions within the data window.

4. The method of claim 1, wherein the projected engine power requirement is further based on attributes of the engine and the vehicle, and the vehicle attributes include at least one of the vehicle mass, wheel radius, rear axle ratio, available gear ratios of the transmission, motoring curve of the engine, and torque curve of the engine.

5. The method of claim 2, the method further comprising:
   determining a change state of the current route condition and/or the forward route condition based on the incremental power, wherein the change state defines whether a relative change in the incremental power is increasing, decreasing, or neutral relative to a threshold value; and
   determining a mode based on the projected engine power requirement and the change state, wherein the mode at least partially defines criteria used to generate the gear request, wherein the gear request is further based on the mode and the criteria.

6. The method of claim 3, the method further comprising:
   determining a hill state based on the incremental power relative to a threshold value, wherein the hill state defines whether a relative change in the grade of the route is uphill, downhill, or about level; and
   determining a mode based on the projected engine power requirement and the hill state, wherein the mode at least partially defines criteria used to generate the gear request, wherein the gear request is further based on the mode and the criteria.

7. The method of claim 6, wherein the criteria include optimizing at least one of the vehicle's drivability, trip time and fuel economy over at least a portion of the route.

8. The method of claim 2, wherein the projected engine power requirement is a vector quantity, wherein the current route condition, forward route condition, projected engine power requirement, and projected change of vehicle speed are vector quantities.

9. The method of claim 1, wherein the gear request is further based on an engine speed and an engine torque for the projected engine power requirement.

10. The method of claim 1, wherein drivability includes at least one of a frequency and/or a timing of gear shift events, a cumulative number of gear shift events, an acceleration capability, and an ability to maintain a given vehicle speed on a given grade.

11. An apparatus comprising:
    a gear state module structured to operate on a controller to control the gear state of a transmission connected to an engine of a vehicle, the gear state module structured to interpret route condition information for a route and a prescribed vehicle speed; to determine an engine power vector, the engine power vector defining the engine power required to substantially maintain the prescribed vehicle speed; to select a gear state for the transmission such that at least one of the vehicle's drivability, trip time and fuel economy are improved for at least a portion of the route; and to communicate the gear state to the transmission; and a mode selection block structured to operate on the engine power vector and the power change vector to generate a mode vector and a speed change vector, wherein the mode vector defines criteria by which to select the gear state, and wherein the speed change vector defines an estimated change of vehicle speed associated with the engine power vector.

12. The apparatus of claim 11, wherein the gear state module further comprises:
a gear selection block structured to operate on the engine power vector, the speed change vector, and the mode vector to generate the gear state according to the criteria such that at least one of the vehicle's drivability, trip time and fuel economy are improved, wherein the gear selection block is further structured to communicate the gear state to the transmission.

13. The apparatus of claim 11, wherein the gear state module communicates the gear state to the transmission via a transmission controller structured to interrogate and implement the gear state.

14. The apparatus of claim 11, wherein the prescribed vehicle speed is a speed set by an operator of the vehicle, a current vehicle speed, or an interim speed determined by the gear state module.

15. The apparatus of claim 11, wherein the gear state module is further structured to control a prescribed vehicle reference speed, the gear state module structured to select an interim vehicle reference speed and the gear state for the transmission such that at least one of the vehicle's drivability, trip time and fuel economy are improved over at least a portion of the route; and to communicate the interim vehicle reference speed to an engine controller.

16. The apparatus of claim 15, wherein the gear state module enables the interim vehicle reference speed to deviate from the prescribed vehicle speed within prescribed limits, wherein the prescribed limits include a prescribed percentage of the vehicle speed and/or a prescribed speed range about the vehicle speed.

17. The apparatus of claim 11, wherein the route condition information includes grade data for at least a portion of the route, the engine power vector includes a base power vector and an incremental power vector, wherein the base power vector includes the engine power needed to power the vehicle at or near the prescribed vehicle speed on a substantially level grade, the incremental power vector includes engine power needed to power the vehicle at or near the prescribed vehicle speed on a pitch defined by the grade data, the change state block generates a hill vector, and the hill vector defining a relative pitch of the grade data.

18. The apparatus of claim 11, wherein drivability includes at least one of a frequency and/or a timing of gear shift events, a cumulative number of gear shift events, an acceleration capability, and an ability to maintain a given vehicle speed on a given grade.

19. An apparatus comprising:
an engine power module structured to operate on a controller, the engine power module structured to interpret a prescribed vehicle speed and route condition information for a route; to determine an engine power vector and a power change vector, the engine power vector defining the engine power required to substantially maintain the prescribed vehicle speed, the power change vector defining a relative change in the current route condition and the forward route condition; to communicate the power change vector and the engine power vector to a mode selection block; and to communicate the engine power vector to a vehicle speed and gear state selection block;

the mode selection block structured to operate on the power change vector and the engine power vector to generate a gear state mode associated with the route information, wherein the route information includes at least a portion of a route to be traveled by a vehicle; to communicate the gear state mode to the vehicle speed and gear state selection block; and the vehicle speed and gear state selection block structured to operate on the gear state mode to control the gear state of a transmission connected to an engine of a vehicle; to select a gear state for the transmission such that at least one of the vehicle's drivability, trip time and fuel economy are improved for at least a portion of the route; and to communicate the gear state to the transmission.

20. The apparatus of claim 19, wherein the engine power vector is further based on attributes of the engine and vehicle, and the vehicle attributes include at least one of the vehicle mass, wheel radius, rear axle ratio, available gear ratios of the transmission, motoring curve of the engine, and torque curve of the engine.

21. The apparatus of claim 19, wherein the gear state modes include a first gear state defined on a level segment of a road, a second gear state defined on a pre-uphill segment of the road, a third gear state defined on an uphill segment of the road, a fourth gear state defined on a pre-downhill segment of the road, and a fifth gear state defined on a downhill segment of the road.

22. The apparatus of claim 19, wherein the prescribed vehicle speed is a speed set by an operator of the vehicle, a current vehicle speed, or an interim speed determined by the engine power module.

* * * * *